US00RE40405E

(19) United States
(12) Reissued Patent
Schwartz et al.

(10) Patent Number: US RE40,405 E
(45) Date of Reissued Patent: Jun. 24, 2008

(54) METHOD AND APPARATUS FOR SECURING EXECUTABLE PROGRAMS AGAINST COPYING

(75) Inventors: Edward L. Schwartz, Sunnyvale, CA (US); Michael J. Gormish, Redwood City, CA (US)

(73) Assignee: Ricoh Company, Ltd., Tokyo (JP)

(21) Appl. No.: 09/414,994

(22) Filed: Oct. 7, 1999

Related U.S. Patent Documents

Reissue of:
(64) Patent No.: 5,675,645
Issued: Oct. 7, 1997
Appl. No.: 08/423,402
Filed: Apr. 18, 1995

(51) Int. Cl.
*H04L 9/00* (2006.01)

(52) U.S. Cl. ..... 713/187; 713/190; 705/57
(58) Field of Classification Search ..... 713/187, 713/190, 193; 380/201; 705/51, 56, 59, 57
See application file for complete search history.

(56) References Cited

U.S. PATENT DOCUMENTS

| | | | | | |
|---|---|---|---|---|---|
| 4,168,396 | A | * | 9/1979 | Best | 713/190 |
| 4,433,207 | A | * | 2/1984 | Best | 713/190 |
| 4,465,901 | A | * | 8/1984 | Best | 713/190 |
| 4,558,176 | A | * | 12/1985 | Arnold et al. | 713/190 |
| 4,562,305 | A | * | 12/1985 | Gaffney | 713/190 |
| 4,905,277 | A | * | 2/1990 | Nakamura | 713/190 |
| 5,379,342 | A | * | 1/1995 | Arnold et al. | 380/2 |
| 5,504,816 | A | * | 4/1996 | Hamilton et al. | 380/217 |
| 5,533,051 | A | * | 7/1996 | James | 375/240 |
| 5,544,244 | A | * | 8/1996 | Ogura | 713/190 |
| 5,666,411 | A | * | 9/1997 | McCarty | 705/51 |

FOREIGN PATENT DOCUMENTS

EP O 536 943 A2 4/1993

OTHER PUBLICATIONS

Donald E. Knuth. "The Art of Computer Programming," Addison–Wesley Publishing Company. Second Edition. p. 28.

David Sheff. "Game Over: How Nintendo Zapped an American Industry. Captured Your Dollars, and Enslaved Your Children," Random House, Inc. (1993), pp. 160–161.

* cited by examiner

*Primary Examiner*—Matthew Smithers
(74) *Attorney, Agent, or Firm*—Blakely, Sokoloff, Taylor & Zafman LLP

(57) ABSTRACT

A secure system for executing program code in an insecure environment while making it impossible, or at least impractical, to determine how to copy the program code and associated data is provided. A program memory contains encrypted program data and security circuitry contained within an integrated circuit is provided for decrypting the program data as it is needed by a processor. A portion of the processing steps which would be done by the processor in an insecure system is performed in this secure system within the secure circuitry using portions of the decrypted program data which are not provided to the processor. Program data is parsed it out based on a proper request to the security chip from the processor. A key value stored in volatile memory is used in the decrypting process and the volatile memory is positioned on the integrated circuit such that its contents are lost before a chip peel provides access to the volatile memory.

93 Claims, 8 Drawing Sheets

METHOD AND APPARATUS FOR SECURING EXECUTABLE PROGRAMS AGAINST COPYING

Matter enclosed in heavy brackets [ ] appears in the original patent but forms no part of this reissue specification; matter printed in italics indicates the additions made by reissue.

BACKGROUND OF THE INVENTION

The present invention relates to the field of securing executable programs against copying. More specifically, in one embodiment the invention provides security against copying in an open hardware system where access to the processor executing the program and the memory holding the program is assumed.

Securing computer programs (software) against unauthorized copying has been a concern of software developers since software was sold as a separate product. The difficulty lies in the fact that software is easily copied and any copy protection or prevention scheme must allow for the eventual copying of portions of the software if it is to be executed. Unless the software is secured in a chip (integrated circuit) which also contains the microprocessor which will execute the software, the executed portions of the software must pass from the distribution media to the processor along circuit lines which are monitorable. Thus, for a program to be secure and still be useful to its intended user, the program cannot be readily copyable in its generally available form or in the form in which it is executed by the intended user.

Recently, with the increasing need for technical support from a program's developer, the desire for complete documentation, and the fear of viruses, unauthorized copying of some software, especially critical business software, has diminished. However, where software needs no support or documentation and is used on systems where viruses cannot be transmitted, such as video game systems using video game cartridges with game software stored in read-only memory (ROM), unauthorized copying is still prevalent. All that is needed is an understanding of the circuitry used in the game cartridge and a copy of the game program.

An additional concern of the makers of video games, who typically make video game consoles and wish to limit their use to games produced by licensed software producers, is not software copying, but video game console copying to produce consoles which will execute authorized game cartridges or unauthorized, but compatible, game cartridges.

In an unprotected system, a copyist (i.e., a "software pirate" or other unauthorized analyzer or copier of the software) can easily copy program code if it is accessible. Program data, as used herein refers to the data necessary to run the program, which includes instructions (program code), tables of values and image data used to generate screen images. Even if the program data is not easily accessible in its distributed form, a copyist might obtain it by observing a bus between the storage media which holds the program data and the processor to determine the program code. Thus, encryption of the program data alone does not provide real protection, since it must be decoded eventually to be used. Where the program data is stored on video game cartridges and the processor is on a video game console, analyzing the program data is simplified, since the interface between the storage media and the processor is readily available without any hidden communication. In many video game consoles, the entire bus of the CPU is readily available for analysis. This particular problem, of course, extends to all forms of program storage media which are detachable, not just video game cartridges.

Many copy protection systems are a deterrent to casual copyists, but not to determined copyists, who might be willing to spend large sums of money and time to break a copy protection scheme in order to be able to manufacture large numbers of unauthorized copies of a program. For some casual copyists, it is enough to include software-only copy protection, such as the use of secret files or codes not normally accessed or observed by a casual copyist. Many casual copyists will also forgo copying when copying involves construction of cartridges, since this requires the ability to make plastic cases and circuit boards. However, the most determined copyists of cartridges are those who plan to make large numbers of cartridges for sale and thus have the ability to make cartridges once the program data is copied.

Software-only copy protection systems, which might use an undocumented portion of the program data media to store hidden codes, generally rely on "security through obscurity" to prevent only those who are not aware of the copy methods from making workable copies. Therefore, when the goal is to stop large-scale and educated copyists, software-only protection is not viable. Fortunately, where the program data is distributed on media containing hardware elements, as is the case with video game cartridges, hardware copy protection can be included on the cartridge.

Many hardware protection systems rely on the presence of a hardware circuit or device which signals the existence of an authorized copy of the program. The program, when executed, runs a routine to check for the existence of the authorization device. If the authorization device is not present, the program refuses to continue or performs some other undesirable action. These protection systems are open to two methods of attack, both of which could render the protection ineffective.

In a first type of attack, a copyist would analyze the circuitry of the hardware authorization device to determine its essential elements and from that information make duplicate, unauthorized authorization devices. Even if the details of the authorization device are buried in a custom integrated circuit, the integrated circuit could be examined under a microscope layer-by-layer using a chemical peeling process to resolve the circuit features. The operation of the authorization device might also be observed by slowing down or speeding up both the authorization device circuitry and the processor to aid in the detailed analysis of one operation or the high-speed analysis of many passes over the program.

In a second type of attack, the copyist attempts to modify the software routines which check for the exists of the authorization device so that the routines always report back that the authorization device is in place, whether or not it actually is. With a readily-available logic analyzer attached to a microprocessor running a program, a copyist can run the processor at a slow speed and have the logic analyzer record all instructions executed by the microprocessor and all the data traffic to and from the microprocessor, then use this information to determine the flow of the program. If the flow of the program is recorded both with the authorization device in place (simulating an authorized use) and without the authorization device in place (simulating an unauthorized use), the copyist can compare the flows and determine where in the program the decision is made as to whether the authorization device is in place. Once that location is determined, the software at that location could be modified so that the routine which tests for the presence of the authorization device never fails. This can often be done by replacing one conditional jump instruction with an unconditional jump or a NOP (null operation).

Therefore, what is needed is an apparatus which allows a processor to execute program code, over a possibly insecure bus, while requiring an impractical amount of work on the part of a copyist to reproduce the program data for use apart from the apparatus or to reproduce the apparatus.

SUMMARY OF THE INVENTION

The present invention provides a secure system for executing program code in an insecure environment while making it impractical to determine how to copy the program code or associated data. In one embodiment of a secure system according to the present invention, a program memory contains encrypted program data (program instructions, data tables, digitized images, etc.) and security circuitry contained within an integrated circuit is provided for extracting the program data as it is needed by a processor. In various embodiments, the processor is a central processing unit (CPU), a video pixel processor or other low-level CPU requiring program data. A portion of the processing steps which would be done by the processor in an insecure system is performed in this secure system within the secure circuitry using portions of the decrypted program data which are not provided to the processor. Program data is parsed based on a proper request to the security chip from the processor. The security chip tracks which sections of the program memory are proper for the processor to be requesting based which program code in being executed. The security circuitry includes a key register in which a key value, needed to decrypt the program code, is stored. For security, a different key value can be used for each different program.

Where a risk of chip peeling exists, the key might be stored in volatile memory powered by a battery or stored as charge on capacitor, positioned and/or distributed on the security chip surface such that a chip peel breaks the source of power to the volatile memory well before the volatile memory can be reached.

In a specific embodiment, the security chip extracts the branch statements from the program instructions and stores them in an internal branch table after decryption and before providing the instructions to the processor. In a preferred embodiment, the branch statements are separated before being encrypted and stored in the program memory. Because the possible flows of the program are known from the branch table, the branch table only need contain a listing of the branches which are imminent, thereby saving memory.

In various embodiments, the encryption is complex conventional encryption while in others, to save hardware, is simpler encryption such as XOR'ing with the output of a pseudorandom number generator (PRNG). A number of additional security measures can be applied where needed. For example, if the security chip is positioned to read the processor bus, a tap of the processor bus can be provided so that the security chip can monitor all instruction fetches and data fetches from memory. For example, since the security chip provides all the branch information, the program flow between branches is linear and deterministic. Thus, the security module could perform a checksum on all the bus activity between branches, compare it to a precompiled checksum and refuse to provide more branch information if the checksums do not match, as would be the case if the instructions provided to the processor had been modified in some way.

The security chip could also include a real-time clock, RC (resistor-capacitor) time constant circuit, or other dynamic logic circuit to confirm that the processor is executing instructions at an expected rate. This prevents a processor from being accelerated to speed up the process of running the program through all the possibilities needed to build an unauthorized branch table or from being slowed to perform hardware analysis.

Furthermore, because the security chip maintains the branch table, it can calculate what the next branch is, so that the processor only need provide the values neetled to evaluate whether to take a conditional branch. In order to handle return instructions, the security chip also maintains the program stack for the processor. This security feature prevents the processor from requesting unexpected branch information.

To make a chosen text attack on the encrypted program data more difficult, the program data could be compressed first to remove patterns in the data.

The encryption and decryption could be done as conventional encryption/decryption. However, where low hardware cost is a priority, the encryptor could be just a data scrambler which rearranges the order of the bits or bytes of the program data according to the output of a PRNG. The data decryptor is then just a series of buffers, a multiplexer and a demultiplexer. Where the security chip includes decompression, the buffers might already exist in the decompressor. If the scrambler is used in addition to other encryption, a chosen text attack is made more difficult, since the position of any word or bit in the data cannot be inferred. The PRNG is seeded by the key value or some agreed upon value dependent on the key. Because the file is compressed, less robust encryption can be used. To further defend against analyses in which many different sections of the encrypted program data are compared with the corresponding decrypted data to determine the key value, a secondary key value which varies from section to section could be used. The secondary key value could be a value generated from data stored with the program data and the main key value. Alternatively, a table of secondary keys could be stored with the program data or in the security chip, with the main key value used to select keys from the table.

In some applications, it is also desirable to prevent the operation of an authorized game cartridge on an unauthorized game console. For these applications, the game console is provided with a difficult to copy element and the security chip on the game cartridge requires this element to be present before operating.

A further understanding of the nature and advantages of the inventions herein may be realized by reference to the remaining portions of the specification and the attached drawings.

DESCRIPTION OF THE PREFERRED EMBODIMENTS

Figure 1:
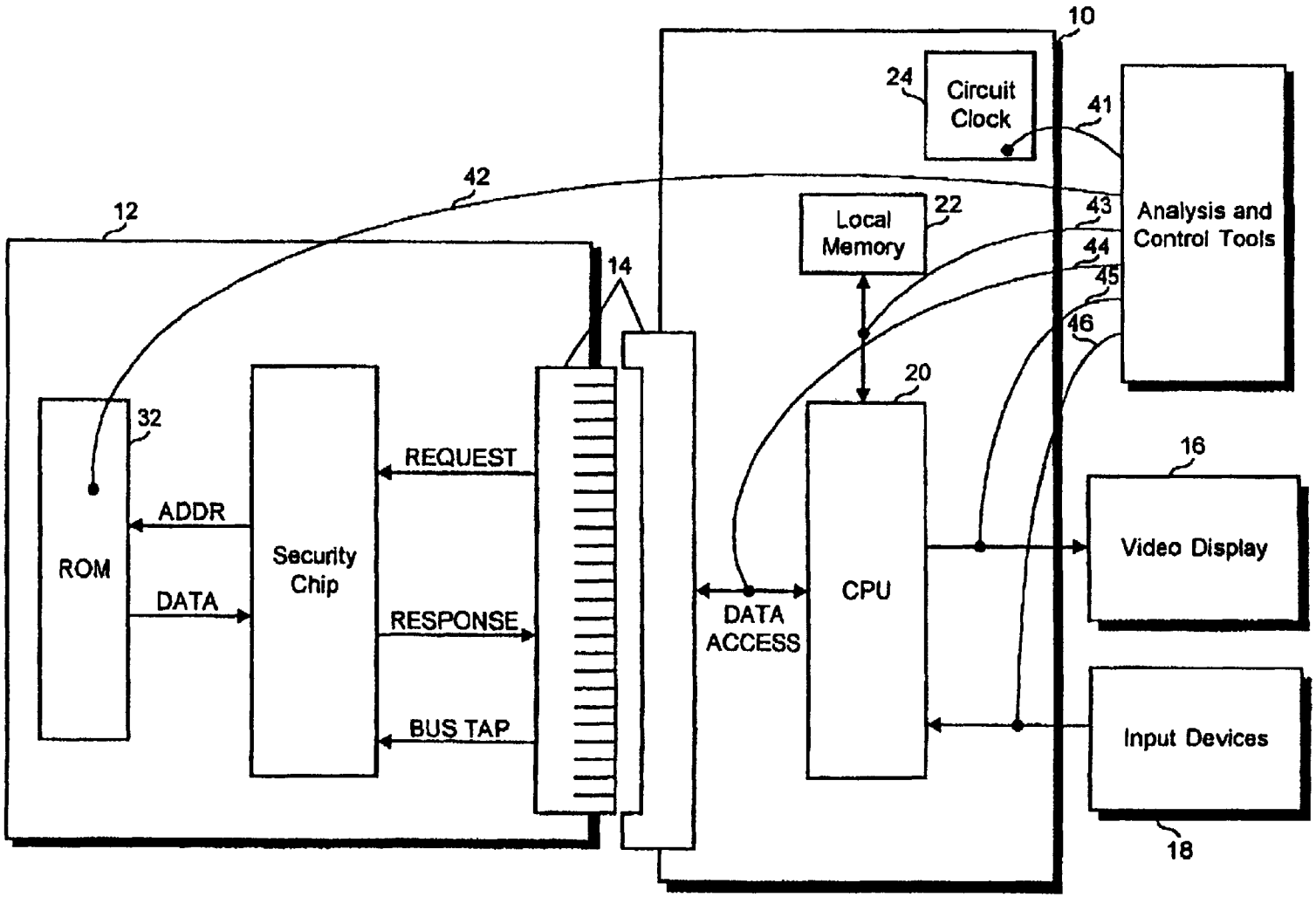
FIG. 1 is a block diagram of a computer system according to the present invention wherein program data resides on a cartridge connected to a processor over a plug-in bus including a security chip on the cartridge.

FIG. 1 shows a common application for the present invention, namely video games. It should be apparent after reading this disclosure that the invention is not limited to video games or programs stored on cartridges. In FIG. 1, a game console 10 is shown with a game cartridge 12 about to be mated to game console 10 via a bus 14. We assume herein that a copyist is able to read the game program and game data as it is stored in game cartridge 12 and is also knows everything that goes on in game console 10. According to the preferred practice in the design of security devices, we also assume that the copyist knows all the derails of any security circuits and algorithms except for any keys or passwords. Because the primary goal of the system is to allow a legitimate user to run the program, it is impossible to prevent the copyist from determining the outcome and flow of the program by running it with a given set of input data. Thus, the goal of the security of this system is to require that the program actually be run, at normal speed, and limit the amount of information about the program which can be inferred from one execution of the program with one input data set. The impracticality of determining the actual program code and data is based on the fact that the number of input data sets which would have to be run against the system is so high that the time needed to perform such an analysis is greater than, or comparable to, the time span in which the bulk of the legitimate sales of the program are made.

Game console 10 is shown with a processor 20, local memory 22, an output interface to a video display 16, an input interface from input devices 18, and a circuit clock 24. Game console 10 might include other elements not shown. The input devices 18 are shown generically, since they are not the subject of the present invention, but might include keyboards, joysticks, touch pads or sensor arrays. Video display 16 is typically a pixelated display (e.g., a raster monitor) which displays a two-dimensional array of pixels colored as indicated by processor 20 or an intermediate video memory (not shown). Local memory 22 stores variables used in the execution of the program as well as a current page of instructions of the program. Local memory 22 need not store the entire program at once, since the program can be paged into local memory 22 as needed. As should be apparent from this description, the security system is described with reference to processor 20, the CPU of game system, however the present invention might also be used with a video processor, image processor or other processor present in the system.

Game cartridge 12 is shown with a security chip 30 and a ROM 32. Other forms of storage can be substituted for ROM 32, such as CD-ROM (compact disk ROM), diskette, flash memory, or even remote programs accessed via a network. ROM 32 contains the game program in an encrypted form. The game program so stored comprises program executable cede, data tables, graphic images and other related objects which are necessary or related to the operation of the game embodied by the cartridge. In a preferred embodiment, security chip 30 is a single integrated circuit with no secure data streams flowing on externally accessible pins.

The present invention cannot protect against all attacks. For example, if a copyist obtains the game program in its unencrypted form from an unscrupulous employee of the game maker, the present invention will not prevent the copyist from distributing the game in that form. It is assumed here that the unauthorized copyist only has access to a game console and a number of game cartridges. With this limited access, the copyist will attempt to analyze the operation of the console and cartridges using various analysis and control tools shown as tools 40 in FIG. 1. An analysis tool records signals, while a control tool changes the signals, often while an analysis tool is recording signals. Such tools include microprocessor trace analyzers, waveform generators, oscilloscopes, etc. FIG. 1 shows various places within the game console 10 and game cartridge 12 the copyist could tap to analyze and control signals. Significantly, the copyist cannot tap onto internal lines of security chip 30 without chemically peeling the security chip and working on a microscopic level.

A tap 41 to circuit clock 24 might be used to slow down the processing speed of game console 10 to more easily analyze its operation, or used to speed up circuit clock 24 to more quickly execute many instructions to test different variations of the program. To render this tap ineffective, security chip 30 might also maintain a clock whose speed is determined internal to security chip 30 and refuse to decrypt program data from ROM 32 if circuit clock 24 does not run at the correct speed.

A tap 42 to ROM 32 provides the copyist with the contents of ROM 32, but these contents are not useful without the decryption provided by security chip 30. A tap 44 on the data traffic on bus 14 or a tap 43 on the data traffic between processor 20 and local memory 22 might provide decrypted program information, but would only provide the instance of the program sequence which applies to one execution of the game instead of a sequence which is usable for different sets of input. Furthermore, that information does not include branching instructions, as those are not sent to the processor, but are executed in security chip 30.

The same is true for a tap 45 on the video display. While tap 45 might be able to record all the video signals, they would only correspond to one particular playing of the game. For example, if a game level containing unique graphics is never reached, the graphics at that game level will never be sent to video display 16 and therefore cannot be obtained by tap 45.

A determined copyist might use a tap 46 on the signals between input devices 18 and processor 20 to insert signals simulating different outcomes and events in the game. With enough different paths, a copyist might be able to determine all the possibilities and work backwards to reconstruct the game program, but because the speed of the processor cannot be increased and due to the sheer number of possibilities, the copyist is not likely to be able to do this between the time a game is released to the public and the game sells enough copies to diffuse the copyist's potential market.

Thus, even with all these taps, a copyist having access to only game console 10 and game cartridge 12 cannot make a full, usable copy of the game program. A determined copyist might tap into the internals of security chip 30 itself, which would require careful removal of the casing of the security chip and a layer-by-layer analysis of security chip 30. However, even knowing the entire internal circuitry of security chip 30, the copyist will not obtain the volatile settings of the key needed for decryption of ROM 32, since the memory holding the key is designed to lose power as layers are removed. If the memory is many layers below the layers required for power, the memory will be erased before its layer is available for analysis. In order to defeat security chip 30, the copyist must be able to analyze the contents of ROM 32 and the output of the security chip to derive the key. In addition to the key being different for each different game (not necessarily each game cartridge containing that game), security chip 30 contains other features which make the cracking of the encryption without access to the internals of security chip 30 more difficult.

Figure 2:
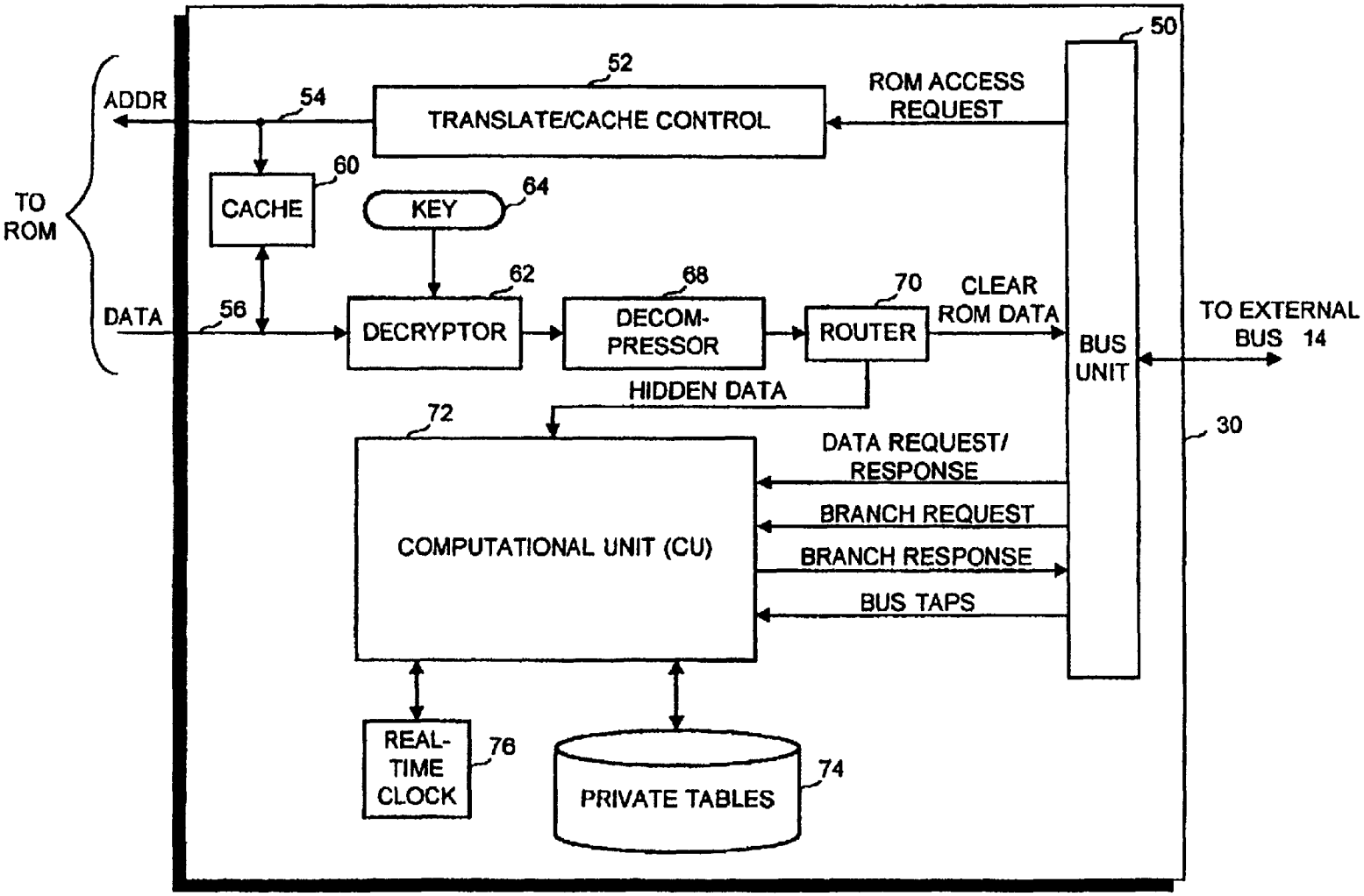
FIG. 2 is a more detailed block diagram of the security chip.

FIG. 2 shows security chip 30 in more detail, including a bus unit 50 which couples security chip 30 to bus 14 and passes requests for program data to a translator 52. Translator 52 converts the addles of the access request into an address location, or range of locations, in ROM 32. This address is sent over an address bus 54 to ROM 32, which returns the data on data bus 56. Alternatively, some locations of ROM 32 might be cached in cache 60, in which case translator 52 routes address information to cache 60, which in turn supplies the cached data.

Both sources of data are coupled to an input of a decryptor 62, which decrypts the data from ROM 32 using a key value supplied from a key register 64. As explained below, different configurations for decryptor 62 are possible depending on the degree of security needed. Since the decryptor 62 is constrained to be, more or less, the inverse of the an encryptor used to encrypt the program data, the different configurations are discussed below in connection with the encryptor.

The output of decryptor 62 feeds to the input of a decompressor 68, which is optional. Decompressor 68 in turn passes the data to a router 70. Router 70 includes an output for clear ROM data and an output for hidden data. The clear ROM data is unencrypted program code and data objects, but without branch information. The hidden data contains the branch information as well as other variables, such as checksums and expected execution times.

The hidden data output is coupled to an input of a computational unit 72, which handles the overall control of security chip 30. Computational unit 72 also includes a port for reading from, and writing to, private tables 74, an input for reading from a real-time clock 76, an input for receiving branch requests from bus unit 50, an output for branch responses coupled to bus unit 50, an input from bus unit 50 for bus taps which provide information about activity occurring over a processor bus or bus 14, and a port for receiving and responding to queries from bus unit 50 about the proprietary of requests for program data. The detailed operation of security chip 30 is described below in connection with FIG. 4.

Figure 3:
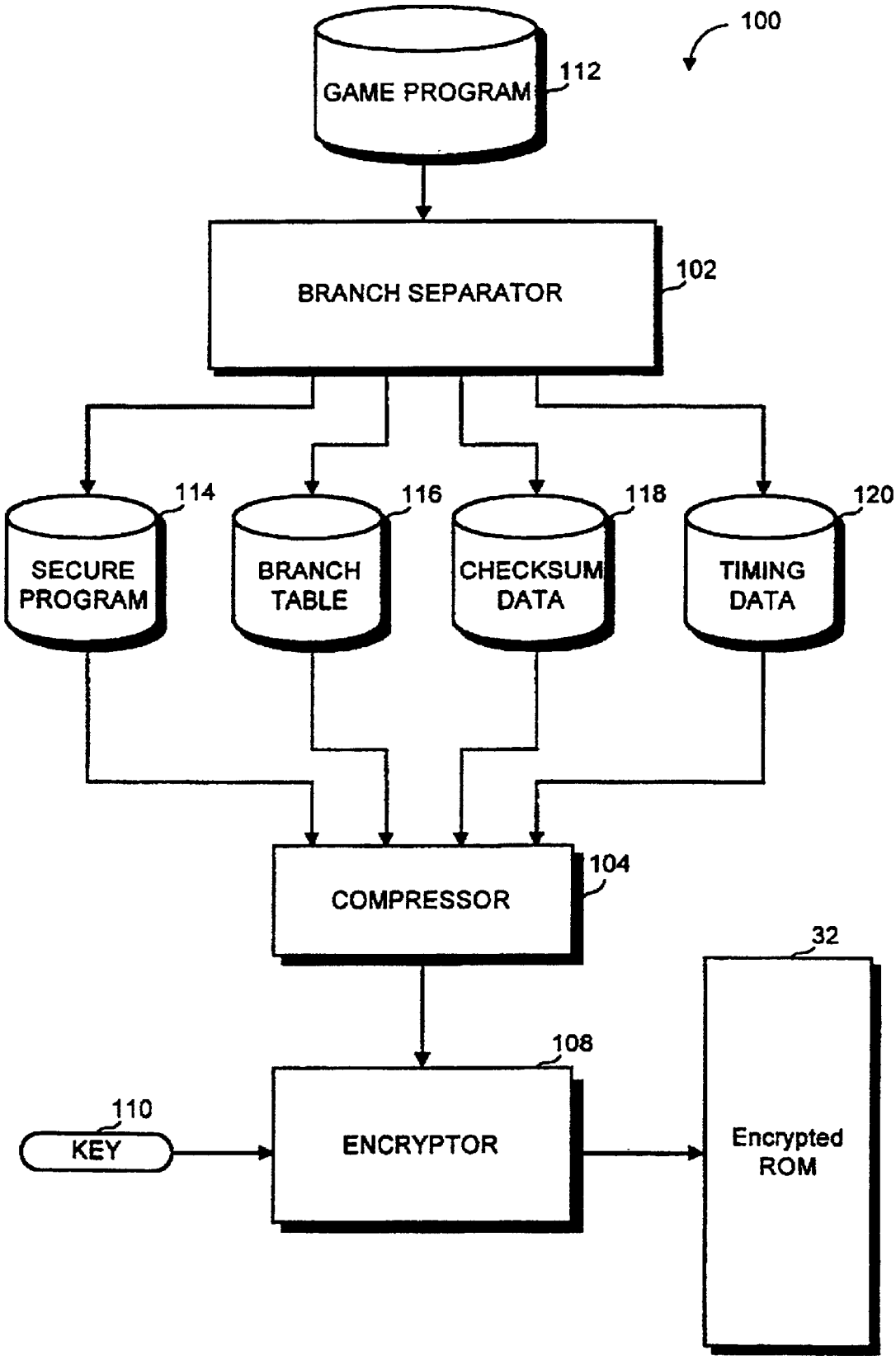
FIG. 3 is a block diagram of a system used to encrypt programs onto encrypted memories which are used in the cartridges.

FIG. 3 is a block diagram of a system 100 used to encrypt a game program 112 onto an encrypted ROM 32 to be used in game cartridge 12. System 100 includes storage for game program 112 coupled to a branch separator 102 which outputs a secure program 114, a branch table 116, a file of checksum data 118 and a file of timing data 120. Storage is provided for these output data sets and that storage is coupled to a compressor 104, which is optional but preferred. The output of compressor 104 is coupled to an input of an encryptor 108, which also has an input for receiving a key value from a key register 110. The output of encryptor 108 forms the contents of ROM 32.

As explained above, game program 112 comprises program executable code, data tables, graphic images and other related objects. A short example of program executable code, useful for explanation purposes only, is shown in Table 1. The program represented in Table 1 is a "clear" program in that all the information needed to run this program for any possible input is apparent from the program alone. Indeed, it should be apparent from Table 1 that the program does nothing more than move the first ten entries of the array a[] into the corresponding locations in b[] for any possible input values (e.g., the values in a[]).

TABLE 1

Clear Program

| Line # | Instruction |
|---|---|
| 0 | i = 0 |
| 1 | if (i >= 10) then goto 7 |
| 2 | call 5 |
| 3 | i = i + 1 |
| 4 | goto 1 |
| 5 | mov a[i], b[i] |
| 6 | return |
| 7 | return |

TABLE 2

Secure Program

| Address | Line # | Instruction |
|---|---|---|
| 0 | 0 | i = 0 |
| 1 | 1 | mov i, br_req_arg[1] |
| 2 | | br_req 0 |
| 3 | 5 | mov a[i], b[i] |
| 4 | 6 | br_req 1 |
| 5 | 2 | br_req 2 |
| 6 | 7 | br_req 3 |
| 7 | 3 | i = i + 1 |
| 8 | 4 | br_req 4 |

TABLE 3

Branch Table (Hidden Data)

| BR # | Type | Argument(s) | True Address | Address |
|---|---|---|---|---|
| 0 | Cond'l | arg[1] > 10 | 6 | 5 |
| 1 | Return | — | — | — |
| 2 | Call | — | 3 | — |
| 3 | Return | — | — | — |
| 4 | Goto | — | 1 | — |

In generating the secure program, the order of the instructions could have been retained, so that the line numbers are in sequential order. However, if they were in order, the analysis of the addresses being passed to security chip 30 would indicate where jumps are being taken and not taken. For example, if the line numbers were in order in the secure program of Table 2, a request for jump address a, followed by a request for jump address n+1 would indicate that the jump associated with address n was not taken (otherwise a jump address other than n+1 would be the next jump address). To prevent this kind of analysis, the order of the lines in the secure program are scrambled. Since a true and false address is stored for each conditional jump, the code following a jump not taken does not need to sequentially follow the jump.

Appendices A, B and C are listings of longer examples of a clear program, its corresponding secure program and branch table, respectively. Appendix D is a listing of a program used in a software implementation of branch separator 102 (FIG. 3). That program is written in the "awk" language which is commonly available on computers running the Unix operating system. As should be apparent, the program in Appendix B cannot be executed without the occasional reference to the branch table of Appendix C.

In some embodiments, branch separator 102 also calculates a checksum for the several instructions executed between each reference to the branch table. Since these several instructions do not contain any branches, they must be executed in the same order every time, and their checksum is easy to calculate. These checksums are stored as checksum data 118. Similarly, in some embodiments, the execution time for the several instructions can be calculated and stored as timing data 120.

If more security against analysis is needed, instead of having the branches performed by security chip 30, security chip 30 could generate interrupts to implement taken branches. If this is done, a copyist would not detect branches not taken.

After secure program 114, branch table 116, checksum data 118 and timing data 120 are generated, if used, this information is compressed by compressor 104. In one embodiment, compressor 104 is the entropy coder shown in U.S. Pat. No. 5,381,145, issued to Allen, Boliek, and Schwartz, and entitled "Method and Apparatus for Parallel Encoding and Decoding of Data." Compression is used not only to allow more data to be stored in a fixed sized ROM, but is used to remove any patterns which might be present in the data, thereby making decryption without the key more difficult.

Encryptor 108 can take several forms. Where security is more of a priority than keeping the hardware cost low, encryptor 108 could be a Data Encryption Standard (DES) encryptor, triple-DES, or a more secure encryption system as is known in the art of data security. Various embodiments of encryptor 108 can be used, depending on the laws of the country in which the game is sold and the country of its intended use, as well as a balancing of security needs and computational limitations. Where security of the encryption process is less of a priority than keeping hardware costs down, several simple encryption circuits might be used. In one embodiment, encryption is merely the process of exclusive "OR"ing (XOR) the clear data with a stream of output bits from a pseudorandom number generator (PRNG). In another embodiment, the order of the clear data is reordered based on the output of the PRNG. With an incremental addition to the hardware cost, both of these methods could be used together.

Figure 6:
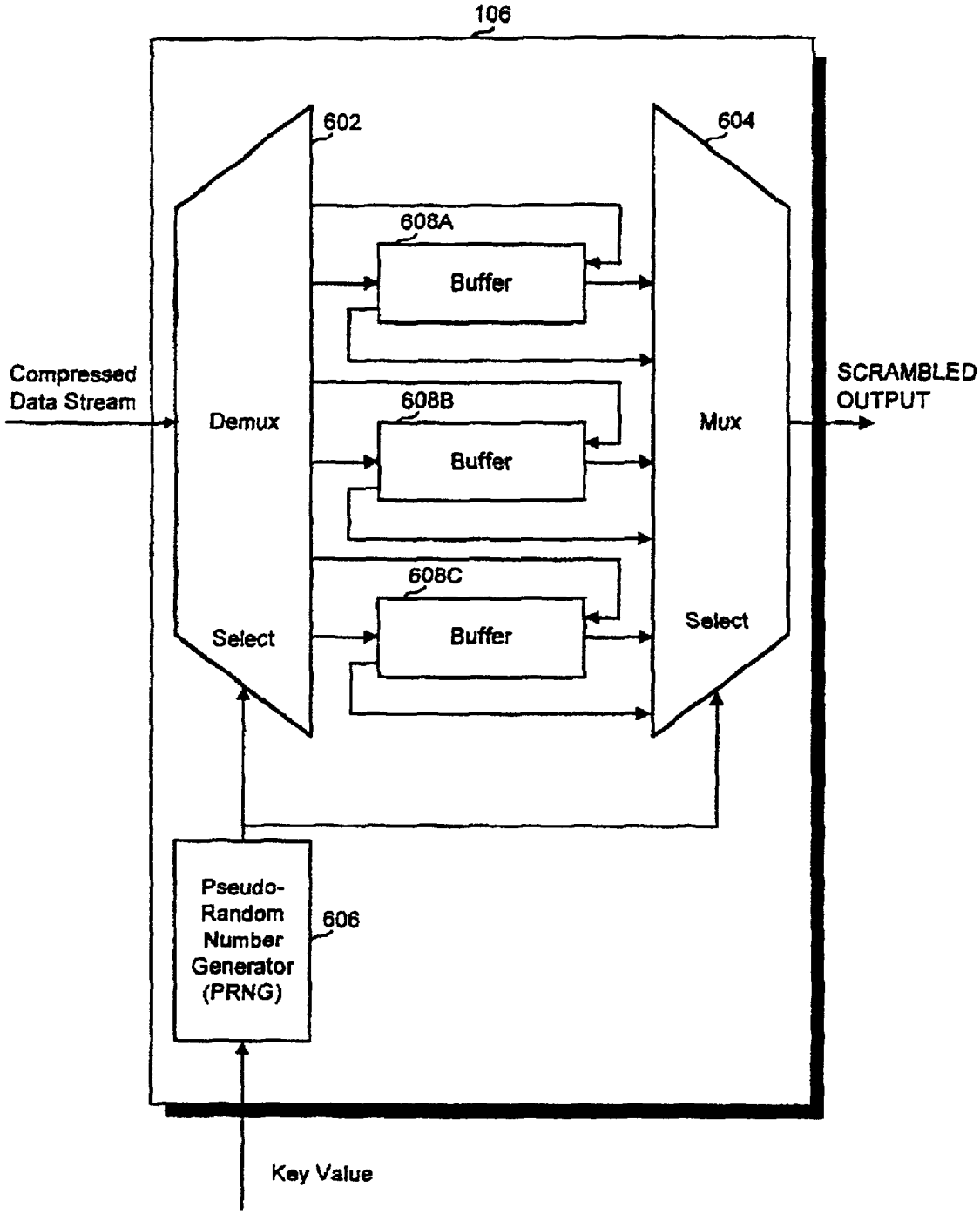
FIG. 6 is a block diagram of a dam stream scrambler.

The simple encryption is low-cost, since a PRNG can be easily build out of a few gates. See, for example, FIG. 7 for a PRNG constructed from a shift register. FIG. 6 shows a detailed diagram of the internal structure of for a data scrambler 106. Data scrambler 106 uses a number of buffers, but the incremental cost of these buffers is zero where the buffers already exist as part of compressor 104.

In another low-cost variation, the encryption is combined with the compression. In this variation, the compression is entropy compression, which uses tables of probability estimates to determine optimal codes to use. Since memory for these table is needed for compression anyway, using them for encryption adds no extra hardware. They are used for encryption by seeding them, initially or during the compression process, according to the key value or numbers based on the key value. An added benefit of this encryption scheme is that it prevents a known plaintext attack on the encryption process since the compression process does not necessarily remove patterns in the data being compressed until the probability tables have had a chance to build up. With the key value providing the initialization for the probability tables, the compression process cannot as easily be analyzed.

Figure 4A:
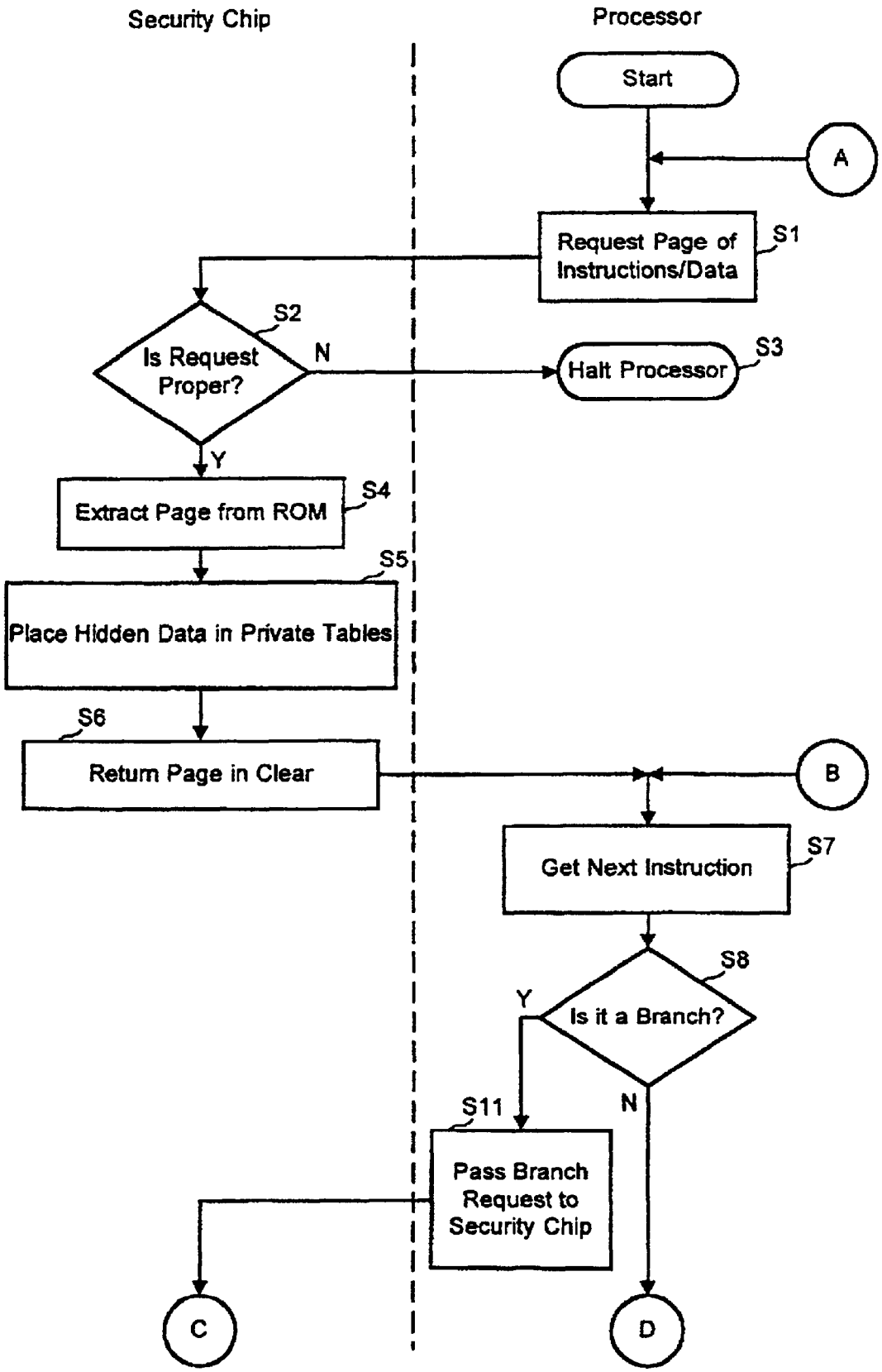
FIGS. 4A and 4B together show a flow chart of an execution of a program by the processor.
Figure 4B:
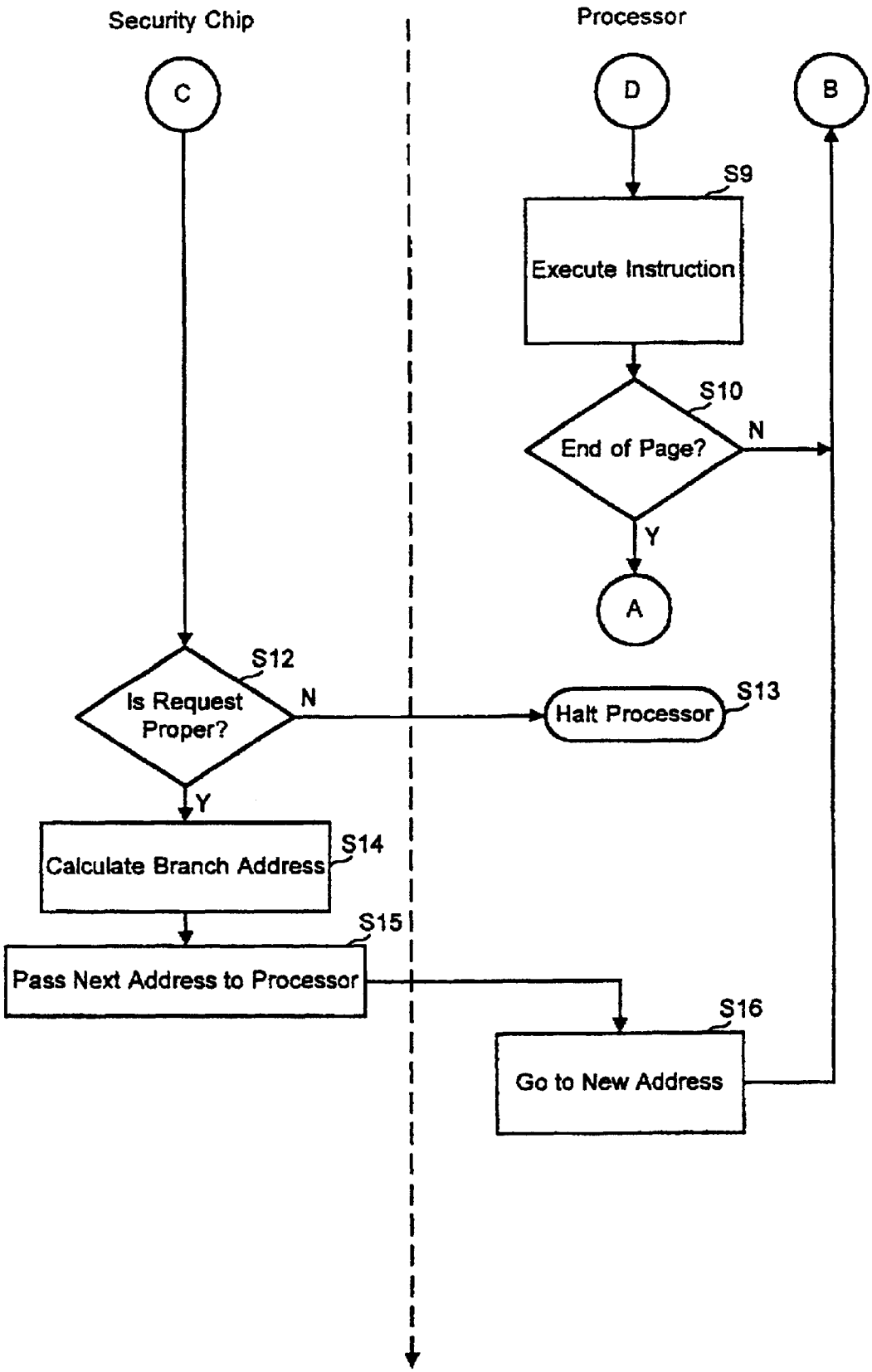

After being encrypted and possibly compressed, the output of encryptor 108 is stored in the encrypted ROM 32. The operation of game console 10 and game cartridge 12 using encrypted ROM 32 will now be described, with reference to FIGS. 1–4. FIG. 4 comprises FIG. 4A and 4B, and together they show the steps taken by processor 20 and security chip 30 to execute a portion of the game program in a secure manner, beginning with a request for a page of instructions and/or data (Step S1).

For ease of implementation, the program data could be arranged in separately compressed data sets, with processor 20 requesting a page by specifying a pointer to a compressed data set, or just a selection of one page from a limited set of pages based on the last decoded page. For more security, each data set could be identified by a random ID associated with it at the time the program is encrypted.

The request for a page is passed over bus 14 to bus unit 50, which in turn queries computational unit 72 as to whether the request was proper (Step S2). Since computational unit 72 maintains the branch table, it can easily determine which instructions should and should not be requested by processor 20. This feature prevents a copyist from controlling the processor 20 such that it requests each and every block of the program in a known order so that the copyist can assemble the entire program in the clear. If the request was not proper, computational unit 72 halts processor 20 (Step S3). Alternatively, computational unit 72 could cause some other effect, such as the erasure of the key value, erasure of ROM 32, cause the slow degradation of the data over time, or other steps to frustrate further analysis. In some embodiments, computational unit 72 responds to a detected attack by altering the flow of the game such that if the copyist succeeds in deducing the flow of the game program, the deduced flow will be limited. For example, computational unit 72 could limit the program flow to just the first several levels of the game.

If the request is proper, the page is extracted from ROM 32 (S4). To do this, the request is processed by bus unit 50 and sent to translator 52. Translator 52 is not necessary where the addresses used by the processor are the same the addresses used to access ROM 32. As Tables 1–2 indicate, the addresses do not always correspond. The addresses also will need translation if the encryption alters the addresses for the data. Once the address of ROM 32 at which the requested page is stored is determined, that address is output on bus 54 to either ROM 32 or cache 60. In either case, the requested data is input to decryptor 62. The returned data might be program instructions or data objects. If the data is program instructions, corresponding entries of the branch table are included with the data, along with the checksum and timing information, if used.

Decryptor 62 uses the key value from key register 64 to decrypt to data. Decryptor 62 is the inverse of encryptor 108, and the key value is either equal to, or the inverse of, the key value stored in key register 110, depending on the type of encryption used. The decrypted data is then decompressed by decompressor 68. The effect of these elements is to reproduce sections of the data in data blocks 114, 116, 118 and 120 shown in FIG. 3. This data is then separated into the secure program (dear ROM data) which is passed back to processor 20 via bus unit 50 and hidden data (branch table, checksums, timing data) which is passed to computational unit 72. Computational unit 72 stores this data in private tables 74 (S5). Bus unit 50 passes the secure program page in the clear to processor 20 (S6). As explained above, the secure program page alone would not allow the copyist to duplicate the operation of the game program.

Once processor 20 has a page of program data, it executes the next instruction in that page (S7). Before executing the instruction, processor 20 checks the instruction to see if it is a branch instruction (S8). If it is not a branch instruction, processor 20 executes the instruction (S9) and checks for further instructions in the page (S10). If more instructions are present, processor 20 gets the next instruction (looping back to step S7), otherwise processor 20 requests the next page from ROM 32 (looping back to step S1).

On the other hand, if the instruction is a branch instruction, which processor 20 does not process, a branch request is passed to security chip 30 (S11). If the branch request is not proper, as determined in step S12, computational unit 72 halts processor 20 (S13). For a request to be proper, it must be expected, must occur at the time expected, and the bus checksum must be correct. The response from security chip 30 to a proper branch request is the address to which processor 20 should branch. Of course, for conditional branches, processor 20 will need to pass one or more arguments to security chip 30, which will calculate which of a true address and a false address to return (S14). Security chip 30 then passes the address back to processor 20 (S15), the processor jumps to that address (S16) and gets the instruction at that address (looping back to step S7). In this way, an address is provided for a branch without processor 20 ever being told what kind of branch it is or what all the possible branch addresses are.

Computational unit 72 is used both to process branch requests and to evaluate whether a request for a branch is proper. To do this, it uses a private branch table, which is stored as part of private tables 74. This branch table need not store all the branches, but just those which are upcoming. For each branch entry in the branch table, the following fields are maintained:

TYPE - the type of branch, selected from:

1) unconditional jump 2) conditional jump 3) subroutine call 4) subroutine return.

CONDITION - Only used with conditional jumps; indicates the condition tested.

ADDRESS 1 - For unconditional jumps and conditional jumps with a true condition, this address is the address to jump to; for calls, it is the called address; and for returns, it is not used.

ADDRESS 2 - Not used for unconditional jumps. For a conditional jump with a false condition, this is the address to jump to; for calls this is the return address, which is saved on a stack. This is not used for returns.

In some embodiments, processor 20 does not specify, and is never told, the index into the branch table for an upcoming branch. In those embodiments, the branch table tracks which branch index should follow the current branch. Of course, the next branch depends on which branch is taken, so that information is stored in the following two fields in those embodiments:

NEXT BRANCH 1 - Indicates the index of the branch in the program code which is the first branch in the code after ADDRESS 1.

NEXT BRANCH 2 - Indicates the index of the branch in the program code which is the first branch in the code after ADDRESS 2.

CHECKSUM - The expected checksum for all the program code preceding the branch.

EXECUTION TIME - The expected execution time from the previous branch to the next branch.

PASSWORD - The password required to execute the current branch.

The TYPE field indicates the type of branch and, consequently, which other fields are used. If example, an entry for an unconditional branch (e.g., "goto 5") need not include a condition or a false condition address. Of course, in some systems other branches are possible, such as conditional calls and conditional returns. In some high-security systems, NOP branches might also be included in the secure program.

The CONDITION field might be expressed as an operand and a constant, for comparisons of a variable against the constant (e.g., "branch if (i>=10)") or just an operand for variable-to-variable comparisons (e.g., "branch if (x<y)"). Where variables are needed for the comparison, they are passed by processor 20 to security chip 30 as part of the branch request. Processor 20 need not be informed of which condition is being applied, just how many and which variables to pass as arguments. In one embodiment, the TYPE field indicates which type of condition field is used and a VALUE field indicates the constant value where one is used.

The ADDRESS 1 and ADDRESS 2 fields supply the next address for the currently requested branch. For conditional branches, ADDRESS 1 is supplied if the condition is true, otherwise ADDRESS 2 is supplied. For unconditional branches, ADDRESS 2 is not used. For calls, ADDRESS 1 is the called address and is supplied to processor 20, while ADDRESS 2 is the address of the instruction following the call (i.e., the return address). That ADDRESS 2 value is placed on a stack for later use with the corresponding return branch. For a return, neither address field is used; the return address comes from the stack.

Table 2 shows a secure program intended to be run by a processor such as processor 20. When the processor reaches a branch request (which replaces a branch in the clear program), the processor makes a branch request and passes to the security chip the index of the branch request with the arguments necessary for the evaluation of a condition. For example, at address 4 in Table 2, a branch request is made for a specific branch index. The instruction "br_req 1" signals that entry 1 is the branch table is to be used. However, for some determined copyists, the index of the branch request might be used to extract branch information. For example, by tracing enough "br_req 1" instructions, the copyist could determine that it is equivalent to a return instruction. In turn, each of the indexed branch requests can be analyzed to determine the type and condition for each branch.

To make this sort of analysis more difficult, the indices in instructions can be eliminated. Thus, instead of the instructions "br_req 1" and "br_req 2" being available to the processor, both of these are known only as "br_req". The indexing information is stored in the fields NEXT BRANCH 1 and NEXT BRANCH 2. Since all branches are controlled by computational unit 72, the branch request following the address of the current branch is known and thus is easily stored. The NEXT BRANCH 1 field contains the index of the next branch when ADDRESS 1 is the branch taken and the NEXT BRANCH 2 field contains the index for the next branch when ADDRESS 2 is the branch taken. For a call, ADDRESS 1 is the start of the called subroutine and ADDRESS 2 is the address of the instruction following the call instruction. Thus, NEXT BRANCH 1 is the index of the first branch in the subroutine and NEXT BRANCH 2 is the index of the first branch following the ADDRESS 2 address. For calls, ADDRESS 2 and NEXT ADDRESS 2 are pushed onto a stack in computational unit 72.

Where used, the CHECKSUM.EXECUTION TIME and PASSWORD fields are used to determine whether the branch request is authorized. After a branch, bus information from bus taps is fed to computational unit 72, which checksums the bus data until a branch is found. The resulting checksum is compared to the stored CHECKSUM value. If these are different, computational unit 72 will take action to prevent the further progress of the game. The checksum can be applied to all traffic over the processor bus except, of course, variable data.

Similarly, real-time clock 76 is used to recorded the time between branches and that time is compared to the EXECUTION TIME value. The expected amount of time is easily determined if the processor clock rate is known, since there are no intervening branches and the known number of instructions between the branches. Alternatively, a separate real-time clock is not needed. If a PRNG is used as part of the decryption process, it could be set to clock each instruction cycle, whether or not it is being used. That way, if extra instructions are inserted, the PRNG would lose sync with the data and corrupt it.

For particularly sensitive branches, a PASSWORD value could be assigned, where the processor must supply the password for the branch to be taken. The PASSWORD value might be calculated from a known combination of the state of the processor or memory contents of the local memory.

Relying on the security chip for branch processing might take longer than if the processor was executing a clear program. Where the execution of code is time-critical, the protection of selected sections of the program code could be disabled so that the processor does its own branch processing. Alternatively, portions of the processing necessary for the time-critical program code could be executed by the security chip to save processing time.

Figure 5:
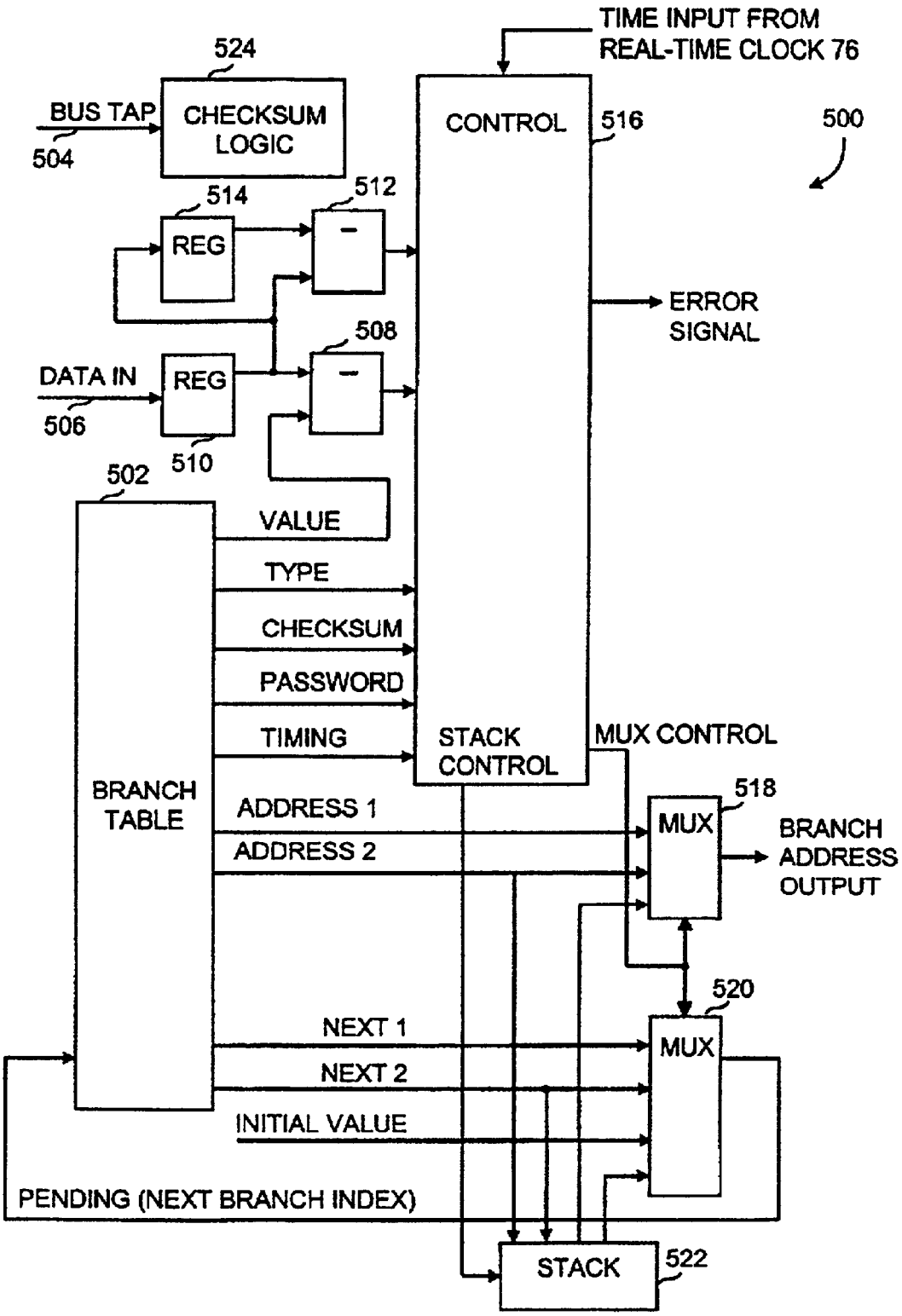
FIG. 5 is a block diagram of a branch unit.

FIG. 5 shows a branch unit 500 which is a part of computational unit 72 used to implement the above rules. Branch unit 500 receives an entry from branch table 502, data from a bus tap 504 and arguments from a DATA IN bus 506 and, based on those inputs, outputs either an error signal indicating an improper branch was requested or a properly requested branch address. In some embodiments, the branch address is passed to processor 20, while in other embodiments the branch address is used to control which instructions are provided to processor 20 without ever informing the processor of the address for those instructions.

Branch unit operates as follows. Once an entry in branch table 502 is selected, the fields VALUE, TYPE, CHECKSUM, PASSWORD, TIMING, ADDRESS 1, ADDRESS 2, NEXT 1 and NEXT 2 are output. The VALUE field is the constant associated with a conditional jump with a comparison to a constant, and forms one input to subtractor 508. The other input to subtractor 508 comes from a register 510 which holds the latest contents of the DATA IN bus. Subtractor 508 provides results for comparisons of a variable argument against a constant, and in some cases merely indicates whether the one input is greater than, equal to, or less than the other input. Subtractor 512 similarly compares the output of register 510 and the output of a second register 514 coupled to register 510. The outputs of both registers are provided to a control section 516.

Control section 516 determines whether an error signal is to be output and also controls two multiplexers (muxes) 518, 520. The output of mux 518 is the branch address, selected from one of ADDRESS 1, ADDRESS 2 and a stack top value from a stack 522. The output of mux 520 is one of NEXT 1, NEXT 2, an initial value, and the stack top value. The output of mux 520 indicates the index for the next branch and is fed back to an index input for branch table 502. The initial value is a pointer to the first branch in the chain of branches, so that the PENDING line is properly initialized.

Control section 516 determines which output of mux 518 is active based on its inputs, as indicated above: when the branch TYPE is an unconditional jump, a call, or a conditional jump with a true condition. ADDRESS 1 is selected. ADDRESS 2 is selected for a conditional jump with a false condition and the stack top is selected for a return branch. In the case of a call, ADDRESS 2 is pushed onto the stack, for use with the next return.

Control section 516 also determines which output of mux 520: when the branch TYPE is unconditional, a call, or a conditional jump with a true condition, NEXT 1 is selected and applied to the PENDING line, NEXT 2 is selected for a conditional jump with a false condition and the stack top is selected for a return branch.

Control section 516 outputs an error signal if the CHECKSUM value from branch table 502 does not match what checksum logic 524 calculates as the checksum from bus tap 504, if the execution time obtained by monitoring real-time clock 76 does not match the expected execution time indicated by the EXECUTION TIME (TIMING) field, or if the password provided by processor 20 does not match the PASSWORD field.

FIG. 6 shows scrambler 106 in more detail. Scambler 106 comprises a demultiplexer (demux) 602, a mux 604, a pseudo-random number generator (PRNG) 606 and a number of buffers 608. Three buffers 608A, 608B and 608C are shown, however the number of buffers is not limited to three. The effect of scrambler 106 on an input data stream is to rearrange the order of bits, bytes, words or blocks of the input data stream in a deterministic and reversible manner.

To do this, demux 602 parses the input data elements (bits, bytes, words or blocks) at its input to one of its outputs as determined by a current pseudorandom number. As the current pseudorandom number changes, the output to which the elements are directed changes. Mux 604 combines the separated streams of elements into one stream as they are output by the buffers. The elements are reordered because they require different amounts of time to travel between demux 602 and mux 604, due to the arrangement of buffers 608. Each buffer 608 is either a first-in, first-out (FIFO) which alternates its head and tail, or is a FIFO which alternates as a last-in first-out (LIFO) buffer. In the former case, each time an element is shifted into a buffer 608 from the left, an element is output to mux 604 from the right and each time an element is shifted into the buffer from the fight, an element is output from the left. In the latter case, elements are pushed into the buffer from either end, but they are output from the right end. The end from which the element is shifted into the buffer 608 is controlled by the values output by PRNG 606.

Figure 7:
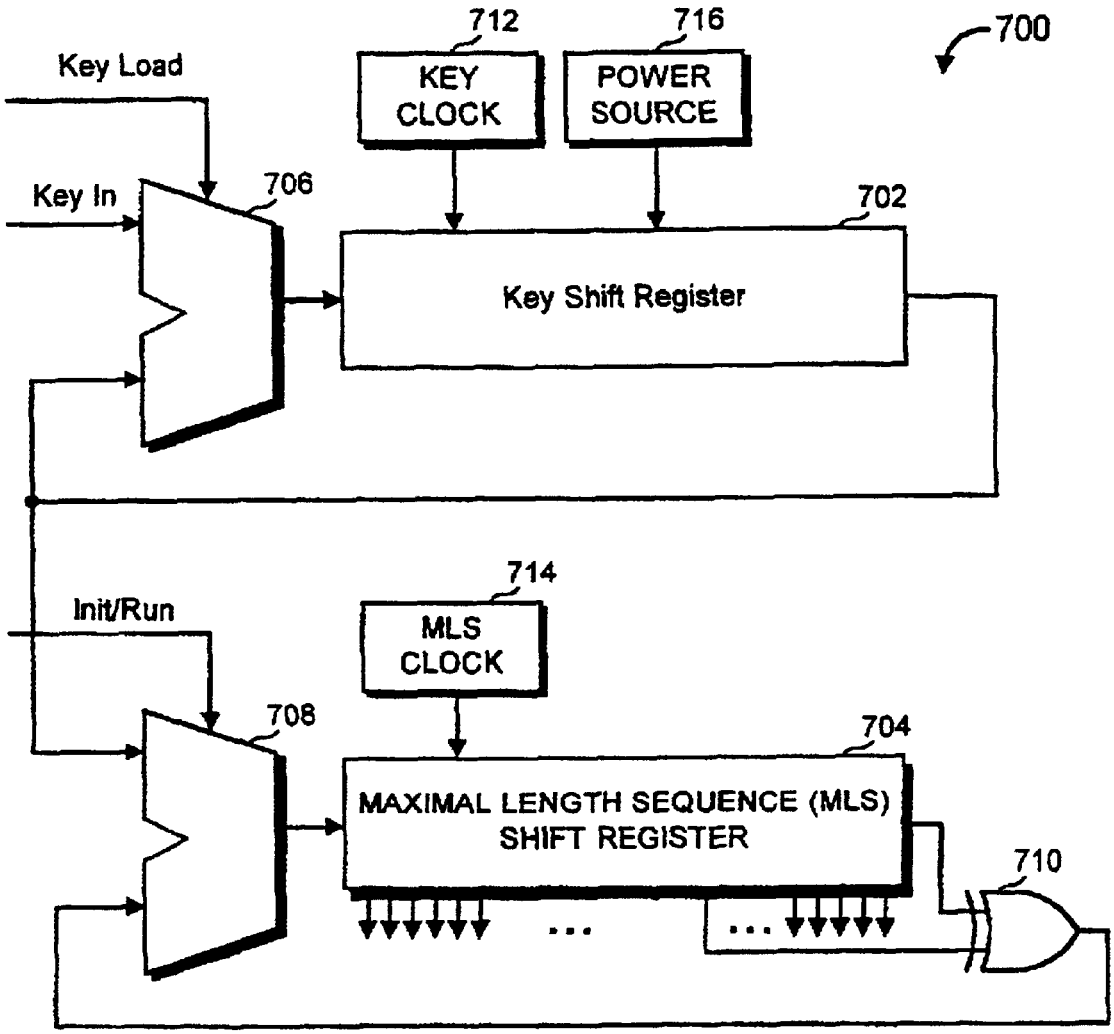
FIG. 7 is a block diagram of a pseudorandom number generator.

Thus, knowing the pseudorandom number sequence, one could discover the reordering pattern and reverse it. In order to discover the pseudorandom number sequence, the key value (stored in key register 64 of FIG. 2 or key register 110 of FIG. 3) must be known, since that key value acts as the seed for PRNG 606. Of course, where hardware is at a premium, scrambler 106 could use portions of the decompressor, or the key value could be used to scramble or modify internal decompression tables, such as probability estimation or R-code tables.

Where hardware logic is especially at a premium, the pseudorandom number generator (PRNG) 700 shown in FIG. 7 can be used. PRNG 700 requires only a key shift register 702, a maximal length sequence (MLS) shift register 704, two muxes 706, 708 and one XOR gate 710. Inputs to PRNG 700 are provided by a key clock 712, an MLS clock 714, a KEY IN serial input, a KEY LOAD signal and an INIT/RUN signal. Once loaded, key shift register 702 can be used as key register 64 or 110, with the application of an uninterruptible power source 716.

FIG. 7 shows the input to key shift register 702 being the output of mux 706, which is either the looped-back output of key shift register 702 or the KEY IN input depending on whether the KEY LOAD signal at the select input of mux 706 is asserted or not. FIG. 7 also shows the input to MLS shift register 704 being the output of mux 708 which is either the output of key shift register 702 or the output of XOR gate 710 depending on whether the INIT/RUN signal at the select input of mux 708 is set to INIT or RUN. The inputs to XOR gate 710 are the output of MLS shift register 704 and one tap from a nonfinal stage of MLS shift register. The particular tap used and the number of stages in MLS shift register determine the length of the pseudorandom number sequence which results. For examples of sequence lengths and tap points, see Knuth, D. E., The Art Of Computer Programming, 2d. Ed., 1981, pp. 27-29 and Table 1 therein. In one embodiment, the number of stages (flip-flops) for MLS shift register 704 is 98 and the number of bits in a key value is 98, however other lengths and taps work equally well. Of course, the number of bits in the key value should be large enough that a copyist cannot easily guess its value. A 98 stage MLS shift register will produce a sequence of bits which repeats only every $2^{98}-1$ bits. With this many stages, the shift register need not be maximal length. One advantage to not having the shift register be maximal length is that the set of taps for maximal length shift registers are known in the art and therefore a non-maximal length shift register would be more difficult to reverse engineer.

The key value is initially loaded into key shift register 702 by asserting the KEY LOAD signal, applying the key to the KEY IN input and clocking key clock 712 until the key value is loaded. Once the key value is loaded, the KEY LOAD signal is unasserted, so that the clocking of key clock 712 merely circulates the key value within key shift register 702. The KEY LOAD signal should be unasserted permanently, which could be done by having the key preceded by a leading "1" bit. That bit is then used to set a flip-flop (not shown) when it reaches the output of key shift register 702. That flip-flop would control whether or not the KEY LOAD signal could be asserted and would also be powered by uninterruptible power source 716.

The key value is circulated in key shift register 702 to read it out. When the INIT/RUN signal is set to INIT, the key value will be clocked into MLS shift register 704 by MLS clock 714, which clocks along with key clock 712. Once loaded, MLS shift register 704 will run and circulate its contents altered, of course, by XOR gate 710 to form a maximal length sequence of pseudorandom numbers, as is known in the art. The pseudorandom numbers of the sequence can be read out in parallel from MLS shift register 704. With a low-cost PRNG such as the one just described, multiple keys become more feasible.

In summary, the above detailed description described a system for preventing the copying of program data by a copyist having access only to the end user portions of the hardware and/or software needed to run the program. While the examples referred to a specific application of protecting game programs which are provided on game cartridges and used with game consoles, other applications were described. Furthermore, the invention is usable even where the program is provided primarily as software, so long as a small hardware component containing the security chip is provided. But one improvement of the present invention over the prior art is that the program data is kept encrypted until decrypted by a security chip, and even then less than all of the program data is provided to a processor—only the program code for executing the instance of the program whose flow is determined for the specific set of inputs provided by the user is made available. The data not provided to the processor is either provided only at a time known to be the appropriate time for the processor to be requesting the program data, or is never provided to the processor. In the latter case, the security chip performs the operations which would have been performed by the processor had the security chip provided all the program data. In one embodiment, the information retained by the security chip is branching information. Thus, each time a processor encountered a branch instruction, that instruction could only be completed with the assistance of the security chip.

The above description also described the internal structure and operation of the security chip, a system for generating encrypted program data, the interaction of the security chip and the processor during normal operation and operation while under attack by a copyist, as well as a low-cost pseudorandom number generator based on a stored key value.

The above description is illustrative and not restrictive. Many variations of the invention will become apparent to those of skill in the art upon review of this disclosure. Merely by way of example, the above description described an embodiment of the invention which protected video game programs from unauthorized copying and use, however non-game applications of the invention follow from this disclosure. Other variations are discussed below.

In one particular embodiment of a video game according to the present invention, the security chip tracks the number of "lives" a player has left and the amount of time remaining until the player must move on to the next level. The security chip decrypts the program data one level at a time, and thus initially provides only the program data for the first level of the game. The program data contains initial values which are never shown in the clear outside the security chip and those values are used to set a timer for the level. As the player is playing the game, the program informs the security chip when certain events occur. If the information from the processor is as expected, the game is played normally. However, if the information is not as expected, time can be added to the timer or "lives" can be removed. If the rime on the timer is extended, the player has more time to wait to get to the next level. If the time is extended often enough due to the program running differently than intended, the timer will never run down and the player will remain on the first level. One advantage to this approach over the security chip simply shutting down the processor is that it is not apparent when in the program the security chip first detects a problem.

The former approach is not without its advantages. If the processor is part of a fault-tolerant system, which might or might not be subject to attack by copyists, the security chip can be used as a means for preventing an errant processor from continuing once it has failed. The same security chip can be used to halt the processor or set off an alarm when improper execution is detected, but the assumption there is that the unexpected operation is caused by hardware or software failure instead of deliberate acts of a copyist.

As an example of non-game use, the processor might perform image processing. In image processing, a convolution might be required. A convolution is performed as a series of many multiply operations and an add operation. Since the security chip can monitor the data bus of the processor, the security chip can perform the addition as the multiply results appear on the bus. When the sum is needed, the processor requests it from the security chip. If the processor is run without the security chip, the convolution will either be wrong or the processor will run slower since it will have to do the accumulation itself.

Where the program data is compressed, elements of the decompressor might be used to contribute to the decryption process. For example, FIG. 6 shows a data scrambler which could be formed from buffers of the decompressor. Also, where the decompressor is an entropy encoder, the security chip could use the key value for form the initial parameters for the decompression process, such as the initial probability values. This has the additional advantage of preventing the one-to-one mapping of bits that usually occurs at the start of the entropy coder before enough bits have been received to infer probabilities from the bits themselves.

When the security chip detects a security violation it need not stop the processor. Other options are to reset the processor after a random delay, output pseudorandom numbers as decoded data or adjust the PRNG by complement enabling or other means so that the PRNG slowly degrades the data being output.

The scope of the invention should, therefore, be determined not with reference to the above description, but instead should be determined with reference to the appended claims along with their full scope of equivalents.

APPENDIX A

Example Clear (w/Branches) Assembly Language Program Listing;
(c) 1994, 1995 RICOH Corporation. All rights Reserved.

```
gcc2__complied.:
__gnu__compiled__c:
.text
        .align 8
LC0:
        .ascii "%d\0"
        .align 8
LC1:
        .ascii " \0"
        .align 8
LC2:
        .ascii "\12\0"
        .align 4
        .global __print__it
        .proc 020
__print__it:
        !#PROLOGUE# 0
        save %sp,-112,%sp
        !#PROLOGUE# 1
        nop
        sethi %hi(__k),%o0
        ld [%o0+%lo(__k)],%o1
        add %o1,-1,%o0
        st %o0,[%fp-12]
L2:
        ld [%fp-12],%o0
        cmp %o0, 0
        bge L5
        nop
        b L3
        nop
L5:
        ld [%fp-12],%o0
        mov %o0, %o2
        sll %o2,2,%o1
        sethi %hi(__x),%o0
        or %o0,%lo(__x),%o2
        sethi %hi(LC0),%o3
        or %o3,%lo(LC0),%o0
```

APPENDIX A-continued

Example Clear (w/Branches) Assembly Language Program Listing;
(c) 1994, 1995 RICOH Corporation. All rights Reserved.

```
        ld [%o1+%o2],%o1
        call __printf,0
        nop
        ld [%fp-12],%o0
        and %o0,3,%o1
        cmp %o1,0
        bne L6
        nop
        sethi %hi(LC1),%o1
        or %o1,%lo(LC1),%o0
        call __printf,0
        nop
L6:
L4:
        ld [%fp-12],%o1
        add %o1,-1,%o0
        mov %o0,%o1
        st %o1,[%fp-12]
        b L2
        nop
L3:
        sethi %hi(LC2),%o1
        or %o1,%lo(LC2),%o0
        call __printf,0
        nop
L1:
        ret
        restore
        .align 4
        .global __do__it
        .proc 020
__do__it:
        !#PROLOGUE# 0
        save %sp,-120,%sp
        !#PROLOGUE# 1
        at %i0,[%fp+68]
        sethi %hi(__x),%o0
        mov 1,%o1
        st %o1,[%o0+%lo(__x)]
        mov 1,%o0
        st %o0,[%fp-12]
L8:
        sethi %hi(__k),%o0
        id [%fp-12],%o1
        ld [%o0+%lo(__k)),%o0
        cmp %o1,%o0
        b1 L11
        nop
        b L9
        nop
L11:
        sethi %hi(__x),%o0
        mov 4,%o1
        or %o0,%lo(__x),%o2
        add %o1,%o2,%o0
        mov %o0,%o1
        st %g0,[%o1]
L10:
        ld [%fp-12],%o1
        add %o1,1,%o0
        mov %o0,%o1
        st %o1,[fp-12]
        b LS
        nop
L9:
        call __print__it,0
        nop
        st %g0,[%fp-16]
L12:
        ld [%fp-16],%o0
        ld [%fp+68],%o1
        cmp %o0,%o1
        b1 L15
        nop
        b L13
        nop
```

APPENDIX A-continued

Example Clear (w/Branches) Assembly Language Program Listing;
(c) 1994, 1995 RICOH Corporation. All rights Reserved.

```
L15:
        sethi %hi(__x),%o0
        ld [%o0+%lo(__x)],%o1
        st %o1,[%fp-20]
        sethi %hi(__k),%o0
        sethi %hi(__l),%o1
        ld [%o0+%lo(__k)],%o0
        ld [%o1+%lo(__l)],%o1
        sub %o0,%o1,%o0
        mov %o0,%o1
        sll %o1,2,%o0
        sethi %hi(__x),%o2
        or %o2,%lo(__x),%o1
        ld [%o0+%o1],%o0
        st %o0,[%fp-24]
        st %g0,[%fp-12]
L16:
        sethi %hi(__k),%o0
        ld [%o0+%lo(__k)],%o1
        add %o1,-1,%o0
        ld [%fp-12],%o1
        cmp %o1,%o0
        b1 L19
        nop
        b L17
        nop
L19:
        ld [%fp-12],%o0
        mov %o0,%o1
        sll %o1,2,%o0
        sethi, %hi(__x),%o2
        or %o2,%lo(__x),%o1
        ld [%fp-12],%o2
        mov %o2,%o3
        sll %o3,2,%o2
        sethi %hi(__x+4),%o4
        or %o4,%lo(__x+4),%o3
        ld [%o2+%o3],%o2
        st %o2,[%o0+%o1]
L18:
        ld [%fp-12],%o1
        add %o1,1,%o0
        mov %o0,%o1
        st %o1,[%fp-12]
        b L16
        nop
L17:
        sethi %hi(__k),%o1
        ld [%o1+%lo(__k)],%o0
        mov %o0,%o1
        sll %o1,2,%o0
        sethi %hi(__x-4),%o2
        or %o2,%lo(__x-4),%o1
        ld [%fp-20],%o2
        ld [%fp-24],%o3
        xor %o2,%o3,%o4
        subcc %g0,%o4,%g0
        addx %g0,0,%o2
        st %o2,[%o0+%o1]
        call __print__it,0
        nop
L14:
        ld [%fp-16],%o1
        add %o1,1,%o0
        mov %o0,%o1
        st %o1,[%fp-16]
        b L12
        nop
L13:
L7:
        ret
        restore
        .align 8
LC3:
        .ascii "Usage: mlsg L K %lines\12\0"
        .align 8
```

APPENDIX A-continued

Example Clear (w/Branches) Assembly Language Program Listing;
(c) 1994, 1995 RICOH Corporation. All rights Reserved.

```
LC4:
        .ascii "\11"
        .ascii "0 < L < K < %d\12\0"
        .align 4
        .global __usage
        .proc 020
__usage:
        !#PROLOGUE# 0
        save %sp,-104,%sp
        !#PROLOGUE# 1
        sethi %hi(__iob+40),%o1
        or %o1,%lo(__iob+40),%o0
        sethi %hi(LC3),%o2
        or %o2,%lo(LC3),%o1
        call __fprintf,0
        nop
        sethi %hi(__iob+40),%o1
        or %o1,%lo(__iob+40),%o0
        sethi %hi(LC4),%o2
        or %o2,%lo(LC4),%o1
        mov 100,%o2
        call __fprintf,0
        nop
        mov 1,%o0
        call __exit,0
        nop
L20:
        rst
        restore
        .align 4
        .global __main
        .proc 020
__main:
        !#PROLOGUE# 0
        save %sp,-112,%sp
        !#PROLOGUE# 1
        st %i0,[%fp+68]
        st %i1,[%fp+72]
        call __main,0
        nop
        ld [%fp+68],%o0
        cmp %o0,4
        be L22
        nop
        call __usage,0
        nop
L22:
        mov 4,%o0
        ld [%fp+72],%o1
        add %o0,%o1,%o0
        mov %o0,%o1
        ld [%o1],%o0
        call __atoi,0
        nop
        sethi %hi(__l),%o1
        st %o0,[%o1+%lo(__l)]
        mov 8,%o0
        ld [%fp+72],%o1
        add %o0,%o1,%o0
        mov %o0,%o1
        ld [%o1],%o0
        call __atoi,0
        nop
        sethi %hi(__k),%o1
        st %o0,[%o1+%lo(__k)]
        mov 12,%o0
        ld [%fp+72],%o1
        add %o0,%o1,%o0
        mov %o0,%01
        ld [%o1],%o0
        call __atoi,0
        nop
        st %o0,[%fp-12]
        sethi %hi(__l),%o0
        ld [%o0+%lo(__l)],%o1
        cmp %o1,0
```

APPENDIX A-continued

Example Clear (w/Branches) Assembly Language Program Listing;
(c) 1994, 1995 RICOH Corporation. All rights Reserved.

```
        ble L24
        nop
        sethi %hi(__l),%o0
        ld [%o0+%lo(__l)],%o1
        cmp %o1,98
        bg L24
        nop
        sethi %hi(__k),%o0
        ld [%o0+%lo(__k)],%o1
        cmp %o1,1
        ble L24
        nop
        sethi %hi(__k),%o0
        ld [%o0+%lo(__k)],%o1
        cmp %o1,99
        bg L24
        nop
        sethi %hi(__l),%o0
        sethi %hi(__k),%o1
        ld [%o0+%lo(__l)],%o0
        ld [%o1+%lo(__k)],%o1
        cmp %o0,%o1
        bge L24
        nop
        b L23
        nop
L24:
        call __usage,0
        nop
L23:
        ld [%fp−12],%o0
        call __do__it,0
        nop
L21:
        rst
        restore
        .common __k,4,"bss"
        .common __l,4,"bss"
        .common __x,400,"bss"
; End of Listing.
```

APPENDIX B

Corresponding Secure Assembly Language Program;
(C) 1994, 1995 RICOH Corporation. All Rights Reserved.
Register %o7 is a register unused in the input assembly code

```
gcc2__complied.:
__gnu__compiled__c:
.text
        .align 8
LC0:
        .ascii "%d\0"
        .align 8
LC1:
        .ascii " \0"
        .align 8
LC2:
        .ascii "\12\0"
        .align 4
        .global __print__it
        .proc 020
__print__it:
        !#PROLOGUE# 0
        save %sp,−112,%sp
        !#PROLOGUE# 1
        nop
        sethi %hi(__k),%o0
        ld [%o0+%lo(__k)],%o1
        add %o1,−1,%o0
        st %o0,[%fp−12]
```

APPENDIX B-continued

Corresponding Secure Assembly Language Program;
(C) 1994, 1995 RICOH Corporation. All Rights Reserved.
Register %o7 is a register unused in the input assembly code

```
L2:
        ld [%fp−12],%o0
        sethi %hi(__SC__data),%o7
        st %o0,[%o7+%lo(__SC__data)]
        b __SC__branch+0
        nop
LSC0:
        b __SC__branch+1
        nop
L5:
        ld [%fp−12],%o0
        mov %o0,%o2
        sll %o2,2,%o1
        sethi %hi(__x),%o0
        or %o0,%lo(__x),%o2
        sethi %hi(LC0),%o3
        or %o3,%lo(LC0),%o0
        ld [%o1+%o2],%o1
        b __SC__branch+2
        nop
LSC1:
        ld [%fp−12],%o0
        and %o0,3,%o1
        sethi %hi(__SC__data),%o7
        st %o1,[%o7+%lo(__SC__data)]
        b __SC__branch+3
        nop
LSC2:
        sethi %hi(LC1),%o1
        or %o1,%lo(LC1),%o0
        b __SC__branch+4
        nop
LSC3:
L6:
L4:
        ld [%fp−12],%o1
        add %o1,−1,%o0
        mov %o0,%o1
        st %o1,[%fp−12]
        b __SC__branch+5
        nop
L3:
        sethi %hi(LC2),%o1
        or %o1,%lo(LC2),%o0
        b __SC__branch+6
        nop
LSC4:
L1:
        b __SC__branch+7
        restore
        .align 4
        .global __do__it
        .proc 020
__do__it:
        !#PROLOGUE# 0
        save %sp,−120,%sp
        !#PROLOGUE# 1
        st %i0,[%fp+68]
        sethi %hi(__x),%o0
        mov 1,%o1
        st %o1,[%o0+%lo(__x)]
        mov 1,%o0
        st %o0,[%fp−12]
L8:
        sethi %hi(__k),%o0
        ld [%fp−12],%o1
        ld [%o0+%lo(__k)],%o0
        sethi %hi(__SC__data),%o7
        st %o1,[%o7+%lo(__SC__data)]
        st %o0,[%o7+%lo(__SC__data)]
        b __SC__branch+8
        nop
LSC5:
        b __SC__branch+9
        nop
```

APPENDIX B-continued

Corresponding Secure Assembly Language Program;
(C) 1994, 1995 RICOH Corporation. All Rights Reserved.
Register %o7 is a register unused in the input assembly code

```
L11:
        sethi %hi(__x),%o0
        mov 4,%o1
        or %o0,%lo(__x),%o2
        add %o1,%o2,%o0
        mov %o0,%o1
        st %g0,[%o1]
L10:
        ld [%fp-12],%o1
        add %o1,1,%o0
        mov %o0,%o1
        st %o1,[%fp-12]
        b __SC__branch+10
        nop
L9:
        b __SC__branch+11
        nop
LSC6:
        st %g0,[%fp-16]
L12:
        ld [%fp-16],%o0
        ld [%fp+68],%o1
        sethi %hi(__SC__data),%o7
        st %o0,[%o7+%lo(__SC__data)]
        st %o1,[%o7+%lo(__SC__data)]
        b __SC__branch+12
        nop
LSC7:
        b __SC__branch+13
        nop
L15:
        sethi %hi(__x),%o0
        ld [%o0+%lo(__x)],%o1
        st %o1,[%fp-20]
        sethi %hi(__k),%o0
        sethi %hi(__l),%o1
        ld [%o0+%lo(__k)],%o0
        ld [%o1+%lo(__l)],%o1
        sub %o0,%o1,%o0
        mov %o0,%o1
        sll %o1,2,%o0
        sethi %hi(__x),%o2
        or %o2,%lo(__x),%o1
        ld [%o0+%o1],%o0
        st %o0,[%fp-24]
        st %g0,[%fp-12]
L16:
        sethi %hi(__k),%o0
        ld [%o0+%lo(__k)],%o1
        add %o1,-1,%o0
        ld [%fp-12],%o1
        sethi %hi(__SC__data),%o7
        st %o1,[%o7+%lo(__SC__data)]
        st %o0,[%o7+%lo(__SC__data)]
        b __SC__branch+14
        nop
LSC8:
        b __SC__branch+15
        nop
L19:
        ld [%fp-12],%o0
        mov %o0,%o1
        sll %o1,2,%o0
        sethi %hi(__x),%o2
        or %o2,%lo(__x),%o1
        ld [%fp-12],%o2
        mov %o2,%o3
        sll %o3,2,%o2
        sethi %hi(__x+4),%o4
        or %o4,%lo(__x+4),%o3
        ld [%o2+$o3],%o2
        st %o2,[%o0+%o1]
```

APPENDIX B-continued

Corresponding Secure Assembly Language Program;
(C) 1994, 1995 RICOH Corporation. All Rights Reserved.
Register %o7 is a register unused in the input assembly code

```
L18:
        ld [%fp-12],%o1
        add %o1,1,%o0
        mov %o0,%o1
        st %o1,[%fp-12]
        b __SC__branch+16
        nop
L17:
        sethi %hi(__k),%o1
        ld [%o1+%lo(__k)],%o0
        mov %o0,%o1
        sll %o1,2,%o0
        sethi %hi(__x-4),%o2
        or %o2,%lo(__x-4),%o1
        ld [%fp-20],%o2
        ld [%fp-24],%o3
        xor %o2,%o3,%o4
        subcc %g0,%o4,%g0
        addx %g0,0,%o2
        st %o2,[%o0+%o1]
        b __SC__branch+17
        nop
LSC9:
L14:
        ld [%fp-16],%o1
        add %o1,1,%o0
        mov %o0,%o1
        st %o1,[%fp-16]
        b __SC__branch+18
        nop
L13:
L7:
        b __SC__branch+19
        restore
        .align 8
LC3:
        .ascii "Usage: misg L K #lines\12\0"
        .align 8
LC4:
        .ascii "\11"
        .ascii "0 < L < K < %d\12\0"
        .align 4
        .global __usage
        .proc 020
__usage:
        !#PROLOGUE# 0
        save %sp,-104,%sp
        !#PROLOGUE# 1
        sethi %hi(__iob+40),%o1
        or %o1,%lo(__iob+40),%o0
        sethi %hi(LC3),%o2
        or %o2,%lo(LC3),%o1
        b __SC__branch+20
        nop
LSC10:
        sethi %hi(__iob+40),%o1
        or %o1,%lo(__iob+40),%o0
        sethi %hi(LC4),%o2
        or %o2,%lo(LC4),%o1
        mov 100,%o2
        b __SC__branch+21
        nop
LSC11:
        mov 1,%o0
        b __SC__branch+22
        nop
LSC12:
L20:
        b __SC__branch+23
        restore
        .align 4
        .global __main
        .proc 020
```

APPENDIX B-continued

Corresponding Secure Assembly Language Program;
(C) 1994, 1995 RICOH Corporation. All Rights Reserved.
Register %o7 is a register unused in the input assembly code

```
__main:
        !#PROLOGUE# 0
        save %sp,-112,%sp
        !#PROLOGUE# 1
        st %i0,[%fp+68]
        st %i1,[%fp+72]
        b __SC__branch+24
        nop
LSC13:
        ld [%fp+68],%o0
        sethi %hi(__SC__data),%o7
        st %o0,[%o7+%lo(__SC__data)]
        b __SC__branch+25
        nop
LSC14:
        b __SC__branch+26
        nop
LSC15:
L22:
        mov 4,%o0
        ld [%fp+72],%o1
        add %o0,%o1,%o0
        mov %o0,%o1
        ld [%o1],%o0
        b __SC__branch+27
        nop
LSC16:
        sethi %hi(__l),%o1
        st %o0,[%o1+%lo(__l)]
        mov 8,%o0
        ld [%fp+72],%o1
        add %o0,%o1,%o0
        mov %o0,%o1
        ld [%o1],%o0
        b __SC__branch+28
        nop
LSC17:
        sethi %hi(__k),%o1
        st %o0,[%o1+%lo(__k)]
        mov 12,%o0
        ld [%fp+72],%o1
        add %o0,%o1,%o0
        mov %o0,%o1
        ld [%o1],%o0
        b __SC__branch+29
        nop
LSC18:
        st %o0,[%fp-12]
        sethi %hi(__l),%o0
        ld [%o0+%lo(__l)],%o1
        sethi %hi(__SC__data),%o7
        st %o1,[%o7+%lo(__SC__data)]
        b __SC__branch+30
        nop
LSC19:
        sethi %hi(__l),%o0
        ld [%o0+%lo(__l)],%o1
        sethi %hi(__SC__data),%o7
        st %01,[%o7+%lo(__SC__data)]
        b __SC__branch+31
        nop
LSC20:
        sethi %hi(__k),%o0
        ld [%o0+%lo(__k)],%o1
        sethi %hi(__SC__data),%o7
        st %o1,[%o7+%lo(__SC__data)]
        b __SC__branch+32
        nop
LSC21:
        sethi %hi(__k),%o0
        ld [%o0+%lo(__k)],%o1
        sethi %hi(__SC__data),%o7
        st %o1,[%o7+%lo(__SC__data)]
        b __SC__branch+33
        nop
```

APPENDIX B-continued

Corresponding Secure Assembly Language Program;
(C) 1994, 1995 RICOH Corporation. All Rights Reserved.
Register %o7 is a register unused in the input assembly code

```
LSC22:
        sethi %hi(__l),%o0
        sethi %hi(__k),%o1
        ld [%o0+%lo(__l)],%o0
        ld [%o1+%lo(__k)],%o1
        sethi %hi(__SC__data),%o7
        st %o0,[%o7+%lo(__SC__data)]
        st %o1,[%o7+%lo(__SC__data)]
        b __SC__branch+34
        nop
LSC23:
        b __SC__branch+35
        nop
L24:
        b __SC__branch+36
        nop
LSC24:
L23:
        ld [%fp-12],%o0
        b __SC__branch+37
        nop
LSC25:
L21:
        b __SC__branch+38
        restore
        .common __k,4,"bss"
        .common __l,4,"bss"
        .common __x,400,"bss"
```

APPENDIX C

Corresponding Branch Table for Secure Assembly Program
(C) 1994, 1995 RICOH Corporation. All Rights Reserved.
Branch information in security chip

| ID | Label1 | Label2 | Cond. | Compare |
|---|---|---|---|---|
| 0 | L5 | LSC0: | bge | const 0 |
| 1 | L3 | | always | |
| 2 | __printf,0 | LSC1: | call | |
| 3 | L6 | LSC2: | bne | const 0 |
| 4 | __printf,0 | LSC3: | call | |
| 5 | L2 | | always | |
| 6 | __printf,0 | LSC4: | call | |
| 7 | | | return | |
| 8 | L11 | LSC5: | b1 | var |
| 9 | L9 | | always | |
| 10 | L8 | | always | |
| 11 | __print__it,0 | LSC6: | call | |
| 12 | L15 | LSC7: | b1 | bar |
| 13 | L13 | | always | |
| 14 | L19 | LSC8: | b1 | var |
| 15 | L17 | | always | |
| 16 | L16 | | always | |
| 17 | __print__it,0 | LSC9: | call | |
| 18 | L12 | | always | |
| 19 | | | return | |
| 20 | __fprintf,0 | LSC10: | call | |
| 21 | __fprintf,0 | LSC11: | call | |
| 22 | __exit,0 | LSC12: | call | |
| 23 | | | return | |
| 24 | __main,0 | LSC13: | call | |
| 25 | L22 | LSC14: | be | const 4 |
| 26 | __usage,0 | LSC15: | call | |
| 27 | __atoi,0 | LSC16: | call | |
| 28 | __atoi,0 | LSC17: | call | |
| 29 | __atoi,0 | LSC18: | call | |
| 30 | L24 | LSC19: | ble | const 0 |
| 31 | L24 | LSC20: | bg | const 98 |
| 32 | L24 | LSC21: | ble | const 1 |
| 33 | L24 | LSC22: | bg | const 99 |
| 34 | L24 | LSC23: | bge | var |

APPENDIX C-continued

Corresponding Branch Table for Secure Assembly Program
(C) 1994, 1995 RICOH Corporation. All Rights Reserved.
Branch information in security chip

| ID | Label1 | Label2 | Cond. | Compare |
|---|---|---|---|---|
| 35 | L23 | | always | |
| 36 | __usage,0 | LSC24: | call | |
| 37 | __do__it,0 | LSC25: | call | |
| 38 | | | return | |

APPENDIX D

Source Code Listing for Software Implementation of Branch Separator

```
#l/bin/nawk -f $0 $*
#
# Awk program for automatically removing branch instructions from
# SPARC assembly code generated by gcc so branches can be
# implemented in security chip.
#
# (C) 1994, 1995 RICOH Corporation. All Rights Reserved.
# ======================================================
function do__sc__label( )
{
    sc__label = "LSC" new__label ":";
}
function do__branch1( )
{
    if (opc__return[$1] != 1)
        label[branch__count] = $2;
    if (condition[branch__count] == "") {
        if (opc__return[$1] == 1)
            condition[branch__count] = "return";
        else
            condition[branch__count] = "always";
    }
    print "\tb__SC__branch+" branch__count;
    branch__count++;
}
# conditional branches and calls
# function do__branch2( )
(
    if (opc__call[$1] != 1) {
        split (cmp__save,args,",");
        print "\tsethi %hi(__SC__data),%o7"
        print "\tst " args[1] ",[%o7+%lo(__SC__data)]"
        condition[branch__count] = $1
        if (match (args[2],"^%")) {
        print "\tst " args[2] ",[%o7+%l0(__SC__data)]"
            compare[branch__count] = "var"
        } else {
            compare[branch__count] = "const " args[2];
        }
    } else {
        condition[branch__count] = "call";
    }
    label__flag = 1;
    label2[branch__count] = sc__label;
    do__branch1( );
}
# ======================================================
# Change the initialization here to support parsing assembly code for
# other processors.
# function init__opcodes( )
{
    # Unconditional branches
    opc__b1["b"] = 1;
    # Conditional branches
    opc__b2["bne"] = 1;   opc__b2["be"] = 1; opc__b2["bg"] = 1;
    opc__b2["ble"] = 1;   opc__b2["bg3"] = 1;   opc__b2["bgu"] = 1;
    opc__b2["bleu"] = 1;   opc__b2["bcc"] = 1;   opc__b2["bcs"] = 1;
    opc__b2["bpos"] = 1;   opc__b2["bneg"] = 1;   opc__b2["b1"] = 1;
    # Calls
    opc__call["call"] = 1;
    # Returns
```

APPENDIX D-continued

Source Code Listing for Software Implementation of Branch Separator

```
    opc__return["ret"] = 1;
    # Comparisons
    opc__compare["cmp"] = 1;
    # Instructions that can follow branch instructions
    opc__trail["nop"] = 1;
    opc__trail["restore"] = 1; # occurs after return
}
# ======================================================
BEGIN {
    print "Register %o7 must not be used in the input assembly code"
    print "------------------------------------------------------"
    print ""
    init__opcodes( );
    cmp__flag = 0;
    label__flag = 0;
    branch__count = 0;
    new__label = 0;
    do__sc__label( );
}
# ======================================================
END {
    print ""
    print "------------------------------------------------------"
    print ""
    print "Branch information in security chip"
    print ""
    print "------------------------------------------------------"
    print ""
    print "ID\tLabel1\t\tLabel2\tCond.\tCompare"
    print "--\t------\t\t------\t-----\t-------"
    print ""
    for (i=0;i<branch__count;i++) {
        l1 = label(i);
        while (length(l1) < 8)
            l1 = l1 "        ";
        l2 = label2[i];
        if (l2 == "") l2 = " ";
        print i "\t" l1 "\t" l2 "\t" condition[i] "\t" compare[i]
    }
}
# ======================================================
#
# MAIN
#
# ======================================================
{
    if (comp__flag) {
        cmp__flag = 0;
        if (opc__b2[$1] == 1) {
            do__branch2( );
        } else {
            print "\tcmp " cmp__save;
        }
    } else is ((label__flag == 1) && (opc__trail[$1] == 1)) {
        print $0
        print sc__label;
        label__flag = 0;
        new__label++;
        do__sc__label( );
    }else if (opc__compare[$1] == 1) {
        cmp__flag = 1;
        cmp__save = $2;
    } else if (opc__b1[$1] == 1) {
        do__branch1( );
    } else if (opc__call[$1] == 1) {
        do__branch2( );
    } else if (opc__return[$1] == 1) {
        do__branch1( );
    } else
        print $0;
}
/* End of Listing. */
```

APPENDIX E

Source Code Listing for Program to Test PRNG

```
/*********************************************************
*
* mlsg.c
* An example C program: Test maximal length sequence generator.
*
* (C) 1994, 1995 RICOH Corporation. All Rights Reserved.
*
*********************************************************/
#include <stdio.h>
#define MAX 100
int k, l;
int x[MAX]; /* K Flip-flops are used in hardware */
void print_it( ) {
    int i;
    for (i=k-1;i>=0;i--) {
        printf("%d",x[i]);
        if (i%4 == 0) printf(" ");
    }
    printf("\n");
}
void do_it(int n) {
    int i, j;
    int t1, t2;
    x[0] = 1;
    for (i=1;i<k;i++)
        x[1] = 0;
    print_it( );
    for (j=0;j<n;j++) {
        t1 = x[0];
        /* t2 = x[1]; Alternative*/
        t2 = x[k-1];
        for (i=0;i<k-1;i++)
            x[i] = x[i+1];
        x[k-1] = (t1 != t2) ? 1 : 0; / *XOR gate is used in H/W */
        print_it( );
    }
}
void usage( ) {
    fprintf(stderr,"Usage: mlsg L K #lines\n");
    fprintf(stderr,"\t0 < L < K < %d\n", MAX);
    exit(1);
}
void main (int argc, char **argv) {
    int lines;
    if (argc != 4) usage( );
    l = atoi(argv[1]);
    k = atoi(argv[2]);
    lines = atoi(argv[3]);
    if ((l<1) || (l > MAX-2) || (k < 2) || (k > MAX-1) || (l >= k))
        usage( );
    do_it(lines);
}
/* End of Listing. */
```

What is claimed is:

1. An apparatus for executing a secure program in a computer system, wherein the ability to make workable copies of the secure program from the computer system is inhibited, the apparatus comprising:

a program memory in which the secure program data is stored in an encrypted form;

a security chip coupled to the program memory, the security chip comprising:

means for decrypting portions of the secure program into a clear portion and a remainder portion;

means for providing the clear portion to memory locations accessible by a processor; and remainder memory for storing the remainder portion of the secure program, the remainder memory not directly accessible by the processor;

means for requesting subsets of the remainder portion for use by the processor; and means, within the security chip, for checking that the requested subset is within a valid predetermined set of requested subsets dependent on a stored state for the processor.

2. The apparatus of claim 1, wherein the secure program stored in the program memory is stored with the clear portion and the remainder portion stored separately.

3. The apparatus of claim 1, wherein the remainder portion is a set of branch instructions of the secure program.

4. The apparatus of claim 3, wherein the security chip further includes means for caching branch statements based on recently executed branches.

5. The apparatus of claim 1, wherein the means for decrypting portions of the secure program is configured with a decryption key.

6. The apparatus of claim 5, wherein the decryption key is stored in a volatile memory.

7. [The] *An* apparatus [of claim 6,] *for executing a secure program in a computer system, wherein the ability to make workable copies of the secure program from the computer system is inhibited, the apparatus comprising:*

*a program memory in which the secure program data is stored in an encrypted form;*

*a security chip coupled to the program memory, the security chip comprising:*

*means for decrypting portions of the secure program into a clear portion and a remainder portion, wherein the means for decrypting portions of the secure program is configured with a decryption key, wherein the decryption key is stored in a volatile memory, and* wherein the volatile memory is distributed over the security chip, the security chip further comprising overlying circuitry which overlies and obscures at least a part of the volatile memory*;*

*means for providing the clear portion to memory locations accessible by a processor; and*

*remainder memory for storing the remainder portion of the secure program, the remainder memory not directly accessible by the processor;*

*means for requesting subsets of the remainder portion for use by the processor; and*

*means, within the security chip, for checking that the requested subset is within a valid predetermined set of requested subsets dependent on a stored state for the processor.*

8. The apparatus of claim 7, wherein the overlying circuitry is coupled to a power source for the volatile memory such that the removal of the overlying circuitry removes the power to the overlying circuitry.

9. The apparatus of claim 1, further comprising:

clocking means, within the security chip, for determining a rate of instruction execution of the processor; and timing response means for rejecting processor requests when the clocking means determines that the rate is outside a range of normal operation for the processor.

10. The apparatus of claim 1, further comprising a data decompressor for decompressing the secure program after decryption, wherein the secure program is compressed before encryption.

11. [The] *An* apparatus [of claim 10,] *for executing a secure program in a computer system, wherein the ability to make workable copies of the secure program from the computer system is inhibited, the apparatus comprising:*

*a program memory in which the secure program data is stored in an encrypted form;*

*a security chip coupled to the program memory, the security chip comprising:*

*means for decrypting portions of the secure program into a clear portion and a remainder portion;*

*means for providing the clear portion to memory locations accessible by a processor; and*

*remainder memory for storing the remainder portion of the secure program, the remainder memory not directly accessible by the processor;*

*means for requesting subsets of the remainder portion for use by the processor;*

*means, within the security chip, for checking that the requested subset is within a valid predetermined set of requested subsets dependent on a stored state for the processor; and*

*a data decompressor for decompressing the secure program after decryption, wherein the secure program is compressed before encryption,* wherein the decompressor is an entropy decoder.

12. The apparatus of claim 1, further comprising:

checksum means, within the security chip, for determining a checksum of bus accesses on a processor bus; and checksum response means for rejecting processor requests when the checksum does not match a predetermined checksum for those bus accesses.

13. [The] *An* apparatus [of claim 1,] further comprising *for executing a secure program in a computer system, wherein the ability to make workable copies of the secure program from the computer system is inhibited, the apparatus comprising:*

*a program memory in which the secure program data is stored in an encrypted form;*

*a security chip coupled to the program memory, the security chip comprising:*

*means for decrypting portions of the secure program into a clear portion and a remainder portion;*

*means for providing the clear portion to memory locations accessible by a processor; and*

*remainder memory for storing the remainder portion of the secure program, the remainder memory not directly accessible by the processor;*

*means for requesting subsets of the remainder portion for use by the processor;*

*means, within the security chip, for checking that the requested subset is within a valid predetermined set of requested subsets dependent on a stored state for the processor; and* a data scrambler for reordering data elements of the secure program according to a reversible and deterministic pattern determined by a key value, wherein the secure program is reordered by the inverse of the data scrambler before being placed in the program memory.

14. The apparatus of claim 13, wherein the data scrambler comprises a plurality of first-in, first-out buffers.

15. The apparatus of claim 13, wherein the reversible and deterministic pattern is generated by reference to the output of a pseudorandom number generator.

16. [The] *An* apparatus [of claim 1,] *for executing a secure program in a computer system, wherein the ability to make workable copies of the secure program from the computer system is inhibited, the apparatus comprising:*

*a program memory in which the secure program data is stored in an encrypted form;*

*a security chip coupled to the program memory, the security chip comprising:*

*means for decrypting portions of the secure program into a clear portion and a remainder portion,* wherein the means for decrypting portions of the secure program operates based on the key value and the output of a pseudorandom number generator*;*

*means for providing the clear portion to memory locations accessible by a processor; and*

*remainder memory for storing the remainder portion of the secure program, the remainder memory not directly accessible by the processor;*

*means for requesting subsets of the remainder portion for use by the processor; and*

*means, within the security chip, for checking that the requested subset is within a valid predetermined set of requested subsets dependent on a stored state for the processor.*

17. The apparatus of claim 1, further comprising means for altering the operation of the security chip and the program flow of the secure program when said means for checking detects that the requested subset is not within the valid predetermined set of subsets, whereby the altered operation causes a negative effect on the program flow or operation.

18. The apparatus of claim 17, wherein the means for altering is a means for halting the processor.

19. An apparatus for encrypting program data to prevent unauthorized copying, comprising:

a branch separator for extracting branch statements from the program data;

a compressor for compressing the extracted branch statements and a remainder of the program data to form compressed data; and an encryptor for encrypting the compressed data.

20. An apparatus for encrypting program data to prevent unauthorized copying, comprising:

a branch separator for extracting branch statements from the program data comprising:

means for automatically generating checksum data representing checksums of program data; [and]

means for automatically generating timing information used to assess timing of program data processing;

a compressor for compressing the extracted branch statements, a remainder of the program data, the checksum data, and the timing information, to form compressed data; and an encryptor for encrypting the compressed data.

21. A method of executing a secure program to prevent copying of the secure program in a usable form from information acquired over an insecure processor bus, the usable form being a copy which replaces the functionality of the original, comprising [the steps of]:

accepting a request from a processor over the insecure processor bus for a block of program data, the block of program data including at least one of one or more program instructions or one or more program data elements;

decrypting, in a secure manner, the block of program data into a clear portion and a remainder portion;

providing the clear portion to the processor over the insecure processor bus; [and]

accepting requests from the processor over the insecure processor bus for elements of the remainder portion;

checking that the request is consistent with the state of the processor and previous requests;

processing the requests from the processor for elements of the remainder portion; and responding to the requests with request responses, wherein the request responses do not contain enough information content to recreate the remainder portion with substantially less computational effort than required to create said remainder portion.

22. The method of claim 21, further comprising [the steps of]:

separating a program into the clear portion and the remainder portion to form a secure program; and encrypting the secure program prior to placing the secure program into an insecure memory.

23. The method of claim 22, wherein [the step of] separating [is a step of] *a program into the clear portion and the remainder portion to form a secure program includes* separating branch instructions of the program from other instructions of the program.

24. The method of claim 21, wherein [the step of] decrypting is performed with a decryption key.

25. The method of claim 24, further comprising [the step of] storing the decryption key in a volatile memory.

26. [The] *A* method [of claim 25, further comprising the steps of:] *of executing a secure program to prevent copying of the secure program in a usable form from information acquired over an insecure processor bus, the usable form being a copy which replaces the functionality of the original, comprising the steps of:*

*accepting a request from a processor over the insecure processor bus for a block of program data, the block of program data including at least one of one or more program instructions or one or more program data elements;*

*decrypting, in a secure manner, the block of program data into a clear portion and a remainder portion, wherein the decrypting is performed with a decryption key;*

*storing the decryption key in a volatile memory;* providing a power source to the volatile memory;

covering the volatile memory with a circuit such that the power source is removed from the volatile memory when the circuit is disturbed and the circuit shields the volatile memory from probing*;*

*providing the clear portion to the processor over the insecure processor bus;*

*accepting requests from the processor over the insecure processor bus for elements of the remainder portion;*

*checking that the request is consistent with the state of the processor and previous requests;*

*processing the requests from the processor for elements of the remainder portion; and*

*responding to the requests with request responses, wherein the request responses do not contain enough information content to recreate the remainder portion with substantially less computational effort than required to crate said remainder portion.*

27. The method of claim 21, further comprising [the step of] checking a rate of instruction execution of the processor prior to providing a request response.

28. The method of claim 21, further comprising [the step of] decompressing the secure program after decryption, wherein the secure program is compressed before encryption.

29. The method of claim 21, further comprising [the steps of]:

determining a checksum of bus accesses on a processor bus;

comparing the checksum to a precalculated checksum for a set of instructions of the secure program which are executed under normal operation; and preventing the unobstructed operation of the secure program when the checksum and the precalculated checksum differ.

30. [The] *A* method [of claim 21, further comprising the steps of:] *of executing a secure program to prevent copying of the secure program in a usable form from information acquired over an insecure processor bus, the usable form being a copy which replaces the functionality of the original, comprising:*

*accepting a request from a processor over the insecure processor bus for a block of program data, the block of program data including at least one of one or more program instructions or one or more program data elements;*

*decrypting, in a secure manner, the block of program data into a clear portion and a remainder portion;*

*providing the clear portion to the processor over the insecure processor bus;*

*accepting requests from the processor over the insecure processor bus for elements of the remainder portion;*

*checking that the request is consistent with the state of the processor and previous requests;*

*processing the requests from the processor for elements of the remainder portion;*

*responding to the requests with request responses, wherein the request responses do not contain enough information content to recreate the remainder portion with substantially less computational effort than required to create said remainder portion;* scrambling an order of data elements of the secure program according to a reversible and deterministic pattern determined by a key value prior to storage in an insecure memory; and descrambling the order of the data elements upon proper request of the processor.

31. The method of claim 30, wherein [the step of] scrambling comprises [a step of] generating a pseudorandom number used to form the reversible and deterministic pattern.

32. The method for encrypting a program to prevent unauthorized copying, comprising [the steps of]:

separating program code according to sequences of nonbranch instructions and branch instructions;

compressing the nonbranch instructions to form a first set of compressed data;

compressing the branch instructions to form a second set of compressed data; and encrypting the first and second sets of compressed data.

33. An apparatus for executing a secure program in an insecure computer system, wherein the ability to make workable copies of the secure program during execution of the secure program using the insecure computer system is inhibited, a workable copy being a copy which replaces the functionality of the original secure program, the apparatus comprising:

a program memory in which the secure program[,] data is stored in an encrypted form;

a security chip coupled between the program memory and adapted to be coupled to a processor over an accessible processor bus, the security chip comprising:

means for decrypting portions of the secure program into a clear portion and a remainder portion;

means for providing the clear portion to memory locations accessible by the processor; and remainder memory for storing the remainder portion of the secure program, the remainder memory not directly accessible by the processor except via the security chip;

means for requesting subsets of the remainder portion for use by the processor; and means, within the, security chip, for checking that the requested subset is within a valid predetermined set of requested subsets given a stored state for the processor.

*34. A method of executing a secure program comprising:*

*receiving a first request for program information having a plurality of instructions;*

*determining if the first request is proper;*

*sending a first subset of requested program information if the request is proper;*

*maintaining information regarding a second subset of the requested program information, the second subset relating to at least one instruction in the requested program information not included in the first subset;*

*receiving a second request corresponding to an instruction of the requested program information not in the first subset; and*

*sending information corresponding to the instruction to allow continued execution of the program information as if the instruction had been included in the first subset.*

*35. The method defined in claim 34 wherein receiving the first request comprises receiving a pointer to a compressed data set.*

*36. The method defined in claim 35 wherein the pointer comprises an ID associated with the compress data set whose creation occurred at time of encryption.*

*37. The method defined in claim 34 further comprising preventing continued execution of the program in a manner that the program was originally designed to be executed if the first request is determined to be improper.*

*38. The method defined in claim 37 wherein preventing continued operation comprises halting program execution.*

*39. The method defined in claim 37 wherein preventing continued operation comprises altering program flow.*

*40. The method defined in claim 37 wherein preventing continued operation comprises causing degradation of program execution performance.*

*41. A method for executing a secure program comprising:*

*receiving a first request for program information having a plurality of instructions;*

*determining if the first request is proper;*

*sending a first subset of requested program information if the request is proper;*

*maintaining information regarding a second subset of the requested program information, the second subset relating to at least one instruction in the requested program information not included in the first subset;*

*receiving a second request corresponding to an instruction of the requested program information not in the first subset; and*

*sending information corresponding to the instruction to allow continued execution of the program information as if the instruction had been included in the first subset; and*

*preventing continued execution of the program in a manner that the program was originally designed to be executed if the first request is determined to be improper, wherein preventing continued operation comprises erasing a portion of the program stored in memory.*

*42. The method defined in claim 34 further comprising accessing the requested program information from memory.*

*43. The method defined in claim 42 further comprising translating at least a portion of the requested program information.*

*44. The method defined in claim 42 further comprising decrypting the requested program information.*

*45. The method defined in claim 34 further comprising separating the requested program information between the first subset and a second subset.*

*46. The method defined in claim 34 wherein maintaining information regarding a second subset comprises storing a branch table with information relating to execution of the at least one instruction.*

*47. The method defined in claim 34 wherein maintaining information regarding a second subset comprises storing checksum information relating to execution of instructions in the requested program information.*

*48. The method defined in claim 34 wherein maintaining information regarding a second subset comprises storing timing information relating to execution of instructions in the requested program information.*

*49. The method defined in claim 34 wherein receiving the second request comprises receiving a branch request.*

*50. The method defined in claim 49 further comprising determining if the branch request is proper.*

*51. The method defined in claim 50 further comprising halting execution of instructions in the program information if the branch request is improper.*

*52. The method defined in claim 34 wherein the instruction information comprises a branch address.*

*53. An apparatus for executing a secure program comprising:*

*means for receiving a first request for program information having a plurality of instructions;*

*means for determining if the first request is proper;*

*means for sending a first subset of requested program information if the request is proper;*

*means for maintaining information regarding a second subset of the requested program information, the second subset relating to at least one instruction in the requested program information not included in the first subset;*

*means for receiving a second request corresponding to an instruction of the requested program information not in the first subset; and*

*means for sending information corresponding to the instruction to allow continued execution of the program information as if the instruction had been included in the first subset.*

*54. The apparatus defined in claim 53 wherein the means for receiving the first request comprises means for receiving a pointer to a compressor data set.*

*55. The apparatus defined in claim 54 wherein the pointer comprises an ID associated with the compress data set whose creation occurred at time of encryption.*

*56. The apparatus defined in claim 53 further comprising means for preventing continued execution of the program in a manner that the program was originally designed to be executed if the first request is determined to be improper.*

*57. The apparatus defined in claim 53 further comprising means for accessing the requested program information from memory.*

*58. The apparatus defined in claim 57 further comprising means for translating at least a portion of the requested program information.*

*59. The apparatus defined in claim 57 further comprising means for decrypting the requested program information.*

*60. The apparatus defined in claim 53 further comprising means for separating the requested program information between the first subset and a second subset.*

*61. The apparatus defined in claim 53 wherein the means for maintaining information regarding a second subset comprises means for storing a branch table with information relating to execution of the at least one instruction.*

*62. The apparatus defined in claim 53 wherein the means for maintaining information regarding a second subset comprises means for storing checksum information relating to execution of instructions in the requested program information.*

*63. The apparatus defined in claim 53 wherein the means for maintaining information regarding a second subset comprises means for storing timing information relating to execution of instructions in the requested program information.*

*64. The apparatus defined in claim 53 wherein the means for receiving the second request comprises means for receiving a branch request.*

*65. The apparatus defined in claim 64 further comprising means for determining if the branch request is proper.*

*66. The apparatus defined in claim 65 further comprising means for halting execution of instructions in the program information if the branch request is improper.*

*67. The apparatus defined in claim 53 wherein the instruction information comprises a branch address.*

*68. An article of manufacture comprising one or more recordable media having executable instructions stored thereon which, when executed by a system, cause the processor to:*

*receive a first request for program information having a plurality of instructions;*

*determine if the first request is proper;*

*send a first subset of requested program information if the request is proper;*

*maintain information regarding a second subset of the requested program information, the second subset relating to at least one instruction in the requested program information not included in the first subset;*

*receive a second request corresponding to an instruction of the requested program information not in the first subset; and*

*send information corresponding to the instruction to allow continued execution of the program information as if the instruction had been included in the first subset.*

*69. An apparatus for executing a secure program comprising:*

*an input to receive a first request for program information having a plurality of instructions;*

*a processing unit to determine if the first request is proper and to send a first subset of requested program information if the request is proper;*

*a memory to store information regarding a second subset of the requested program information, the second subset relating to at least one instruction in the requested program information not included in the first subset; and*

*wherein the input receives a second request corresponding to an instruction of the requested program information not in the first subset, and, in response thereto, the processing unit access the memory and sends information corresponding to the instruction and generated in response to the memory access to allow continued execution of the program information as if the instruction had been included in the first subset.*

*70. The apparatus defined in claim 69 wherein the input receives a pointer to a compressed data set, the pointer comprising an ID associated with the compress data set whose creation occurred at time of encryption.*

*71. The apparatus defined in claim 69 wherein the processing unit prevents continued execution of the program in a manner that the program was originally designed to be executed if the first request is determined to be improper.*

*72. The apparatus defined in claim 69 wherein the processing unit accesses the program from memory and translates at least a portion of the requested program information.*

*73. The apparatus defined in claim 69 wherein the processing unit accesses the program from memory and decrypts the requested program information.*

*74. The apparatus defined in claim 69 wherein the processing unit separates the requested program information between the first subset and a second subset.*

*75. The apparatus defined in claim 69 wherein the memory stores information regarding a second subset comprises means for storing a branch table with information relating to execution of the at least one instruction.*

*76. The apparatus defined in claim 69 wherein the memory stores information regarding a second subset comprises means for storing checksum information relating to execution of instructions in the requested program information.*

*77. The apparatus defined in claim 69 wherein the memory stores information regarding a second subset comprises means for storing timing information relating to execution of instructions in the requested program information.*

*78. The apparatus defined in claim 69 wherein the second request comprises a branch request.*

*79. The apparatus defined in claim 78 wherein the processing unit determines if the branch request is proper and sends a branch address if the branch request is proper.*

*80. A method for a processor to execute a program comprising:*

*generating a first request for program information;*

*receiving a portion of the program information requested;*

*executing instructions in the received program information, including*

*generating a second request if program information encountered during execution corresponds to an instruction of a first type that must be executed to continue execution of the program yet is not included in the received program information;*

*receiving non-instruction data in response to the second request; and*

*operating on the non-instruction data to continue execution of the program as if the instruction had been executed by the processor.*

*81. An apparatus for executing a program comprising:*

*means for generating a first request for program information;*

*means for receiving a portion of the program information requested; and*

*means for executing instructions in the received program information, including:*

*means for generating a second request if program information encountered during execution corresponds to an instruction of a first type that must be executed to continue execution of the program yet is not included in the received program information;*

*means for receiving non-instruction data in response to the second request; and*

*means for operating on the non-instruction data to continue execution of the program as if the instruction had been executed by the processor.*

*82. An article of manufacture comprising one or more recordable media with executable instructions stored thereon which, when executed by a system, cause the system to:*

*generate a first request for program information;*

*receive a portion of the program information requested; and*

*execute instructions in the received program information by generating a second request if program information encountered during execution corresponds to an instruction of a first type that must be executed to continue execution of the program yet is not included in the received program information;*

*receiving non-instruction data in response to the second request; and*

*operating on the non-instruction data to continue execution of the program as if the instruction had been executed by the processor.*

*83. A method of executing a secure program comprising:*

*providing a first portion of a program to a processor over an insecure processor bus;*

*accepting a request from the processor over the insecure processor bus for elements of a second portion of the program not included in the first portion of the program needed to continue execution of the program;*

*determining whether the request is consistent with expected processor state and any previous requests;*

*processing the request from the processor for elements of the second portion of the program; and*

*sending a response to the request to enable continued execution of the program by the processor without the processor executing an instruction in the second portion of the program.*

*84. The method defined in claim 83 wherein the response comprises a branch address.*

*85. The method defined in claim 83 wherein the response comprises a branch address to which the processor jumps so that the processor doesn't execute the branch instruction that would have caused the processor to perform such a jump.*

*86. An apparatus for executing a secure program comprising:*

*means for providing a first portion of a program to a processor over an insecure processor bus;*

*means for accepting a request from the processor over the insecure processor bus for elements of a second portion of the program not included in the first portion of the program needed to continue execution of the program;*

*means for determining whether the request is consistent with expected processor state and any previous requests;*

*means for processing the request from the processor for elements of the second portion of the program; and*

*means for sending a response to the request to enable continued execution of the program by the processor without the processor executing an instruction in the second portion of the program.*

*87. The apparatus defined in claim 86 wherein the response comprises a branch address.*

*88. The apparatus defined in claim 86 wherein the response comprises a branch address to which the processor jumps so that the processor doesn't execute the branch instruction that would have caused the processor to perform such a jump.*

*89. An article of manufacture comprising one or more recordable media with executable instructions stored thereon which, when executed by a system, cause the system to:*

*provide a first portion of a program to a processor over an insecure processor bus;*

*accept a request from the processor over the insecure processor bus for elements of a second portion of the program not included in the first portion of the program needed to continue execution of the program;*

*determine whether the request is consistent with expected processor state and any previous requests;*

*process the request from the processor for elements of the second portion of the program if the request is determined to be consistent; and*

*send a response to the request to enable continued execution of the program by the processor without the processor executing an instruction in the second portion of the program.*

*90. An apparatus for executing a secure program in cooperation with a processor, the apparatus comprising:*

*a memory;*

*a processing unit coupled to the memory and the input, wherein the processing unit provides a first portion of a program to the processor over an insecure processor bus;*

*an input to accept a request from the processor over the insecure processor bus for elements of a second portion of the program not included in the first portion of the program needed to continue execution of the program, and*

*wherein the processing unit determines whether the request is consistent with expected processor state and any previous requests and processes the request for elements of the second portion of the program if the request is consistent, and thereafter sends a response to the request to enable continued execution of the program by the processor without the processor executing an instruction in the second portion of the program.*

*91. The apparatus defined in claim 90 wherein the response comprises a branch address.*

*92. The apparatus defined in claim 90 wherein the response comprises a branch address to which the processor jumps so that the processor doesn't execute the branch instruction that would have caused the processor to perform such a jump.*

*93. An apparatus for executing a program in a computer system, the apparatus comprising:*

*a program memory to store the program data in a secure manner;*

*a security chip coupled to the program memory, the security chip comprising:*

*means for providing a first portion of the program data to memory locations accessible by a processor; and*

*a memory for storing a second portion of the program data not included in the first portion, the memory not directly accessible by the processor;*

*means for requesting subsets of the second portion of the program data for use by the processor; and*

*means, within the security chip, for determining whether the request is proper based on stored processor state information and for providing information that allows continued execution of instructions in the program data even though the processor does not execute each of the instruction itself.*

* * * * *